(12) United States Patent
Rigney

(10) Patent No.: US 6,889,671 B2
(45) Date of Patent: May 10, 2005

(54) FUEL DELIVERY SYSTEM

(75) Inventor: Shaun Thomas Rigney, Doncaster East (AU)

(73) Assignee: Vaporate PTY LTD, Melbourne (AU)

( * ) Notice: Subject to any disclaimer, the term of this patent is extended or adjusted under 35 U.S.C. 154(b) by 52 days.

(21) Appl. No.: 10/258,904

(22) PCT Filed: Mar. 28, 2002

(86) PCT No.: PCT/AU02/00403
§ 371 (c)(1),
(2), (4) Date: Oct. 30, 2002

(87) PCT Pub. No.: WO02/097259
PCT Pub. Date: Dec. 5, 2002

(65) Prior Publication Data
US 2003/0183209 A1 Oct. 2, 2003

Related U.S. Application Data
(60) Provisional application No. 60/306,606, filed on Jul. 19, 2001.

(30) Foreign Application Priority Data
Jun. 1, 2001 (AU) .............................................. PR5397
Oct. 13, 2001 (AU) .............................................. PR9540

(51) Int. Cl.[7] ........................ F02M 53/06; F02M 21/14; F02M 31/08; F02M 31/18
(52) U.S. Cl. ........................ 123/549; 123/557; 239/129
(58) Field of Search ............................... 123/543–557; 239/86, 129

(56) References Cited

U.S. PATENT DOCUMENTS

| | | | |
|---|---|---|---|
| 3,868,939 A | | 3/1975 | Friese et al. |
| 4,458,655 A | | 7/1984 | Oza |
| 4,646,974 A | * | 3/1987 | Sofianek et al. ............. 239/463 |
| 4,760,818 A | * | 8/1988 | Brooks et al. .............. 123/298 |
| 5,329,901 A | * | 7/1994 | Onishi ........................ 123/254 |
| 5,401,935 A | * | 3/1995 | Smith et al. ................. 219/206 |
| 5,515,814 A | | 5/1996 | Cooke |
| 5,598,826 A | * | 2/1997 | Hunt et al. .................. 123/491 |
| 5,694,906 A | | 12/1997 | Lange et al. |
| 5,894,832 A | * | 4/1999 | Nogi et al. .................. 123/491 |
| 6,109,543 A | | 8/2000 | Bright et al. |
| 6,276,347 B1 | * | 8/2001 | Hunt .......................... 123/549 |
| 6,279,549 B1 | * | 8/2001 | Hunt et al. .................. 123/549 |
| 6,332,457 B1 | | 12/2001 | Imoehl |
| 2001/0052553 A1 | | 12/2001 | Hokao |

FOREIGN PATENT DOCUMENTS

| | | |
|---|---|---|
| DE | 19500184 | 7/1986 |
| EP | 915248 A1 | 5/1999 |
| EP | 915248 | 5/1999 |
| FR | 87-176690/25 | 11/1986 |
| GB | 2206378 | 1/1989 |
| GB | 2281101 | 2/1995 |
| JP | 98-409951/35 | 6/1998 |
| JP | 2002-004974 | 1/2002 |
| WO | WO 200250425 A1 | 6/2002 |

* cited by examiner

Primary Examiner—Marguerite McMahon
(74) Attorney, Agent, or Firm—James Ray & Associates

(57) ABSTRACT

A fuel delivery system is disclosed which includes an injector (40) having an end region (43). The end region (43) is provided from heat conducting material such as metal so that the end region can be heated by exhaust gas to heat the temperature of fuel in the injector end region so that the increase in temperature and pressure within the end region causes the fuel to flash into a vapor state immediately the fuel is ejected from the injector. The exhaust gas is supplied by an exhaust gas supply line (70, 402) and can be returned by an exhaust return line (405).

28 Claims, 23 Drawing Sheets

FUEL DELIVERY SYSTEM

RELATED APPLICATION

This application is based on, and claims the benefit of, Australian Provisional Application No. PR5397 dated 1 Jun. 2001, Australian Provisional Application No. PR9540 dated 13 Dec. 2001, and U.S. Provisional Application No. 60/306,606 dated 19 Jul. 2001.

FIELD OF THE INVENTION

This invention relates to a fuel delivery system for delivering petroleum or gasoline type fuel to an internal combustion engine and to an internal combustion engine and vehicle having that system.

BACKGROUND ART

Many attempts have been made to increase the fuel efficiency of vehicles with varying degrees of success. Most recent advances in improved deficiency have resulted from sophisticated redesign of internal combustion engines and the manner in which they are operated.

Conventionally, a combustible mixture of fuel and air requires an optimum mixture ratio measured by weight of 14.7 to 1, as calculated by the stoichiometric scale. This ratio is arrived at primarily as a balance of power and efficiency whilst operating with a given torque curve, to produce the best possible emissions under conventional operating conditions. Fuel in itself is a cool element because of its properties, and also carries out a cooling function in the combustion chamber of an engine to maintain the integrity of the contacting surfaces, such as valves and pistons. Any reduction in fuel for combustion will cause an increase in combustion chamber and exhaust gas temperatures, to the point where parts will melt or cease due to expansion and a reduction in clearances and tolerances in the engine, and hence the engine fails.

Attempts have been made to improve fuel efficiency by providing some sort of heating mechanism between an injector and the cylinders of the engine. These systems operate on the principle that fuel in liquid form will be ejected by the injector and after injection, the fuel will be vaporised before delivery to the cylinders of the engine.

SUMMARY OF THE INVENTION

The object of the present invention is to provide a fuel delivery system which increases fuel efficiency and which is easy to implement either as an add on part to an existing engine or to incorporate as original equipment in a manufactured engine.

The invention, in a first aspect, may be said to reside in a fuel delivery system for an internal combustion engine having at least one cylinder and a piston arranged for reciprocating movement in the cylinder, the system including;

a fuel injector having a body and an end region from which fuel is delivered for delivering fuel to the cylinder;

a fuel passage extending between the fuel injector and the cylinder for conveying fuel from the delivery element to the cylinder; and means for heating the end region of the injector to thereby heat fuel in the end region before the fuel is ejected from the injector, so that as soon as the fuel is ejected from the injector, the fuel converts to vapour state and is maintained in a vapour state as the fuel travels along the fuel passage from the injector to the cylinder.

The present inventor has found that the conventional techniques which attempt to heat fuel to vaporise the fuel do so by attempting to heat the fuel after the fuel has been ejected from the injectors. The fuel which is ejected is therefore in liquid form rather than in vapour form and, in the prior art techniques, some heating mechanism is provided downstream from the injector to attempt to convert the fuel into vapour state. Because of the short amount of time it takes for the fuel to travel from the injector under engine suction into the cylinder, and the relatively short path length, the heating mechanisms do not adequately function to convert the liquid fuel into vapour form and therefore these systems do not operate satisfactorily. Thus, systems working on this principle have not found significant commercial application. The inventor has found that by heating the injector end region and therefore the fuel in that part of the injector, the fuel maintains its liquid state in the end region because of the constant pressure within the injector, but as soon as the fuel leaves the injector, there is an immediate change in state of the liquid fuel to vapour caused by the reduction of pressure that the fuel encounters as soon as it leaves the tip and thermal expansion of the heated fuel.

Therefore the fuel converts immediately when it leaves the injector from liquid state into a vapour state by a flash off effect at the injector. Thus, all of the fuel is vaporised and is maintained in a vaporised state as the fuel passes from the injector to the cylinder of the engine. The maintenance of the vapour in the vapour state occurs by the heating means supplying heat to the fuel as the vapour leaves the injector so that the vapour state is maintained.

As the vapour moves along the fuel passage, the vapour will tend to expand out into the surrounding gas flow which may tend to slightly cool the fuel as the fuel travels the length of the passage, but nevertheless, the heat and the dispersion of the fuel in the gas flow along the fuel passage maintains the gas in the vapour state so that the fuel is delivered to the cylinder of the engine as fuel vapour. In other words, the heating of the fuel in the injector creates the flash off effect upon ejection of the fuel from the end region and the maintenance of the vapour is due to the warmer ambient temperatures. The dilution of the fuel vapour with the normal intake air creates a cooler heated gas mixture but a still warmer total intake charge so that the fuel is delivered as vapour to the cylinder. Because the fuel is vaporised and delivered as vapour to the cylinder of the engine, the engine can be operated at far leaner mixtures whilst maintaining the integrity of all of the components, the power output and improving emissions and more importantly, prevent the dramatic temperatures that can occur with lean burn mixtures; thereby enabling the amount of fuel which is used to be greatly reduced whilst maintaining engine performance.

By heating the end region of the injector, rather than the body of the injector, the injector is not damaged, which may well occur if the entirety of the injector is heated or fuel is delivered to the injector at a temperature sufficient to cause the flash off effect immediately upon discharge from the end region. If fuel is delivered to the injector at this temperature, or the body of the injector itself is heated, the injector will melt or otherwise be damaged.

Alternatively, if it is desired to increase power rather than decrease fuel consumption, the fuel mixture can be maintained rather than reduced, thereby resulting in an increase in power from the engine.

Preferably the end region of the injector is heated by providing the end region of the injector as a heat conducting end region for conducting heat into the end region of the injector.

In the preferred embodiment of the invention, this is performed by converting a conventional injector by removing the outer casing from the end shaft of the injector so as to expose the end shaft of the injector which is formed from metal, so that the exposed end shaft forms the end region of the injector which is heated by the heating means.

Preferably the means for heating the end region of the injector comprises exhaust gas deliver means for delivering exhaust gas created by combustion of fuel and air in the engine, to the end region of the injector for heating the end region of the injector.

Preferably the exhaust gas delivery means directs the exhaust gas to the end region of the injector so that the exhaust gas impinges on the end region of the injector to heat the end region of the injector and the fuel in the end region of the injector.

In a further embodiment of the invention, the means for heating the end region of the injector includes a heat conducting support element for supporting and contacting the end region of the injector and for contact with a heated portion of the engine so that heat is conducted from the engine, through the support member to the end region of the injector to heat the end region of the injector.

Preferably the support member comprises a ring having a cylindrical outer wall for receipt in a bore in a heated component of the engine for heat transfer from the engine to the ring, and a cylindrical hole having an internal cylindrical wall for receiving the end region of the injector so that the end region is in contact with the inner cylindrical wall so heat is conducted from the heated component to the ring and then to the end region of the injector.

In one embodiment of the invention the fuel delivery system includes a heat exchanger having a heat exchange tube for arrangement in an exhaust outlet of the engine, the heat exchanger tube having one end coupled to an air supply tube for delivering air from an air inlet, and the other end of the heat exchanger being coupled to a hot air return tube for delivering air heated in the heat exchanger tube to the end region of the injector and the passage extending between the fuel delivery element and the cylinder.

In one embodiment of the invention the heated component of the engine is provided on the exhaust side of the engine in the vicinity of the exhaust manifold and an air inlet tube is provided for directing cool air to the end region of the injector so the end region of the injector does not overheat.

In other embodiments of the invention, the heated component is on the air inlet side of the engine.

In this embodiment of the invention an inlet opening is provided for allowing exhaust gas to enter the hot air return tube so that exhaust gas and air pass through the hot air return tube and a mixture of air and exhaust gas is delivered to the end region of the injector and the passage.

Preferably the inlet opening is provided in the heat exchanger tube adjacent where the heat exchanger tube joins the air supply tube.

In this embodiment of the invention the air supply tube is coupled to an idle air supply for the engine so that idle air travels through the supply tube to the passage extending between the fuel delivery element and the cylinder and is heated by passage through the heat exchanger tube and by the mixture of exhaust gas which enters the inlet opening, the exhaust gas and air mixture being supplied with the air to the end region of the injector and the passage extending between the fuel delivery element and cylinder.

Preferably the heat exchanger includes a pipe which couples between an exhaust manifold of the engine and an exhaust pipe which conveys exhaust gas to atmosphere.

Preferably the passage between the fuel delivery element and cylinder comprises a fuel and air delivery tube provided in an air inlet port of the engine.

Preferably a swirler is arranged within the fuel and air delivery tube for causing the mixture of air, exhaust gas and fuel vapour to swirl as it passes along the air and fuel delivery tube to thereby cause the air, exhaust gas and fuel vapour to mix.

Preferably the engine includes a plurality of fuel injectors, the hot air return tube being coupled to a distributor tube, the distributor tube having a plurality of outlet tubes, one of the outlet tubes corresponding to each of the fuel injectors, each outlet tube extending at an angle substantially perpendicular with respect to the direction of fuel ejection from the respective injector.

Air to support combustion of fuel above idle speed of the engine is provided through the inlet manifold so that, in the preferred embodiment, only idle air passes through the air and fuel delivery tube with additional air to support combustion above idle speed being delivered through the inlet manifold and inlet port of the engine.

Thus, the tube which delivers the fuel to the cylinder is relatively small compared to the usual size of the air inlet port and since the fuel is delivered through the air and fuel tube with heated air and exhaust gas good heat exchange takes place, and the, the fuel is heated for its substantially entire passage of the fuel along the air and fuel tube so that the fuel is delivered as vapor to the cylinder.

In a second embodiment of the invention the passage for delivering fuel and air passes through the exhaust port and through the engine head to the air inlet port, the passage having an inlet opening in the exhaust port so exhaust gas is drawn into the passage for mixing with the air and fuel delivered from the passage to the cylinder.

Thus, according to this embodiment of the invention the main heat exchange for vaporising the fuel occurs in the passage which extends through the exhaust port of the engine.

Preferably the air supply tube passes through a heat exchanger arranged on the exhaust outlet of the engine for primary heating of the air which is then delivered about the fuel injector.

In a further embodiment of the invention the passage is arranged within the air inlet manifold as in the first embodiment of the invention, the passage having an air inlet branch extending into the air inlet and an exhaust gas delivery branch communicating with the exhaust port of the engine, an exhaust gas delivery tube extending between the exhaust gas inlet and the air delivery branch and extending through the passage, so that when fuel is injected into the passage from the fuel injector the fuel mixes with air entering the inlet branch and travels along the passage about the exhaust gas delivery tube so that heat exchange takes place to heat the air and fuel in the passage as the fuel travels from the injector to the cylinder, and wherein exhaust gas passing through the exhaust gas tube flows into the air inlet branch and is drawn with the inlet air traveling through the air inlet branch into the passage so as to further heat the air and fuel mixture.

In one embodiment of the invention the system includes temperature maintaining means for maintaining the temperature of the exhaust gas supplied to the end region of the injector to a predetermined temperature to prevent overheating of the end region.

Preferably the temperature maintaining means comprises a valve for selectively allowing or shutting off flow of cooling air to mix with the exhaust gas to thereby reduce the temperature of the exhaust gas.

Preferably temperature sensing means is provided within the vicinity of the end region for monitoring the temperature of the exhaust gas and opening the valve to allow flow of cooling air into the exhaust gas if the temperature raises above the predetermined temperature.

The invention in a second aspect may be said to reside in a fuel delivery system for an internal combustion engine having at least one cylinder, a piston for reciprocating movement in the cylinder, an air inlet port for delivery of air into the cylinder and an exhaust port for discharge of exhaust gas from the cylinder, the system including;

a fuel injector having a body and an end region from which fuel is delivered, for delivering fuel;

a small passage which has a cross-sectional area and volume smaller than the inlet port extending between the injector and the cylinder, for delivering fuel and a proportion of the air required by the engine to support combustion of fuel in the engine above idle speed of the engine; and means for heating the end region of the injector to thereby heat fuel in the end region before the fuel is ejected from the injector, so that as soon as the fuel is ejected from the injector, the fuel converts to vapour state and is maintained in a vapour state as the fuel travels along the fuel passage from the injector to the cylinder.

The small passage, in one embodiment of the invention, extends for only part of the distance between the injector and the cylinder and has a first end which is arranged adjacent the end region of the injector and a second end which communicates with the inlet port so that the vaporised fuel initially passes through the small passage and then into the inlet port for mixture with combustion air drawn into the inlet port by suction of the engine.

In one embodiment of the invention the heating means comprises a heat exchanger for heating the portion of the air prior to delivery of the air to the end region of the injector.

Preferably in this embodiment of the invention the portion of the air is mixed with exhaust gas discharged from the cylinder so as to further heat the air so that the heated air and exhaust gas mixture is supplied to the end region of the injector and the passage.

Preferably the portion of the air is idle air supply of the engine and the system includes an idle air supply tube extending from an idle solenoid to the heat exchanger and connecting with a heat exchanger tube within the heat exchanger, the heat exchanger tube being connected to a hot gas return tube, means for delivering exhaust gas into the hot air return tube so that the exhaust gas mixes with the idle air to heat the idle air, the return tube being coupled to supply the exhaust gas and idle air mixture to the end region of the injector so that the heated idle air and exhaust gas mixture envelope the end region of the injector to heat the end region and so that fuel vapour delivered by the injector travels with the heated idle air and exhaust gas mixture through the passage to the cylinder.

In one embodiment of the invention the passage includes a swirler for causing the idle air, exhaust gas and fuel vapour mixture to swirl and thoroughly mix as it travels along the passage to the cylinder.

In one embodiment of the invention the hot air return tube is coupled to a distributor tube, the distributor tube having a plurality of outlets each corresponding to one of a plurality of the fuel injectors for supplying the exhaust gas and idle air mixture to the fuel injectors to mix with fuel vapour supplied by the injectors.

In one embodiment of the invention the passage comprises a tube for installation in the inlet port of the engine, the tube having a cross-sectional area and volume which is smaller than the cross-sectional area and volume of the inlet port.

Preferably the fuel injector is located in a bore in the head of engine, the bore communicating with the distribution tube and also the fuel and air delivery tube.

In another embodiment of the invention the tube can be integrated into the head of the engine rather than provided as a separate tube installed in the inlet port of the engine.

Preferably the idle air supply is provided by an idle air transfer block for installation between the idle air solenoid and throttle valve body, the block having a first bore which communicates with an inlet opening for delivery of idle air and the block having a second bore which communicates with a conduit through the idle air solenoid and connects with the idle air supply tube. In this arrangement the idle air opening on the downstream side of a butterfly valve of the throttle body is blocked off so idle air cannot enter the engine other than through the idle air supply tube.

In a further embodiment of the invention the heat exchanger is formed by part of the passage which, in use, is exposed to exhaust gas discharged from the cylinder, the passage passing through the block to the inlet port of the engine.

Preferably the passage passes through a bore extending from the exhaust port to the inlet port of the engine.

In this embodiment the passage communicates with a spacer block having a bore, the bore communicating with a distributor tube which is coupled with the idle air supply tube for receiving the idle air.

In one embodiment the injector is located in the distributor tube with the end region in heat conducting contact with the distributor tube to thereby heat the end region, the injector delivering fuel into the bore of the spacer block so that the fuel mixes with air supplied by the idle air supply tube and then passes through the passage to the inlet manifold and cylinder of the engine.

In this embodiment, the distributor tube and spacer block are coupled on the exhaust manifold of the engine, which provides a very hot heat source for heating the end region of the injector, and the delivery of idle air to the distributor tube not only provides combustion air, but also provides a cooling effect to the end region to prevent the end region from overheating.

Preferably the passage is provided with an opening for allowing exhaust gas to pass into the passage to maintain fuel and air travelling along the passage in a heated state so that the fuel is delivered as vapor to the inlet port and cylinder of the engine.

In another embodiment the distributor tube is insulated from the spacer block, and the idle air supply tube extends through a heat exchanger for location on the exhaust manifold of the engine to heat the portion of the air supplied to the distributor to heat the end region of the injector.

Once again, in this embodiment of the invention the passage can be in the form of a tube which is installed in the exhaust port and extends through the bore in the head to open into the inlet port of the engine. However, the tube could be formed as an integral part of the bore by casting or otherwise drilling the tube into the head of the engine.

In a further embodiment of the invention the passage includes an exhaust inlet branch which couples with the exhaust port of the engine, the branch being connected to an exhaust tube which extends in the passage, the passage having an air inlet branch and a fuel delivery end, the exhaust tube which is coupled to the exhaust branch extending into the air delivery branch so that some inlet air travelling through inlet air manifold can pass into the air inlet branch mix with exhaust gas delivered from the exhaust tube and then pass into the passage to travel with fuel injected into the inlet end along the passage to the cylinder, and wherein the exhaust gas passing through the exhaust tube performs a heat exchange with the air and fuel in the passage, and the mixing of exhaust gas also maintains the air and fuel vapour mixture.

In this embodiment the outlet end of the exhaust gas tube is adjacent a domed baffle so that exhaust gas exiting the exhaust tube is deflected to travel in the direction of air flow though the air inlet branch and mix with the air travelling in the inlet branch for delivery to the passage.

In the preferred embodiment of the invention the passage, exhaust branch and inlet air branch are formed as a unitary tube which is installed in the inlet port of the engine. However, once again, in other embodiments the tube could be cast into the engine block or head or drilled in the engine block or head so as to form original equipment with the engine block or head.

The invention in a third aspect may be said to reside in a fuel delivery system for an internal combustion engine having at least one cylinder, a piston for reciprocating movement in the cylinder, an air inlet port for delivery of air into the cylinder and the exhaust port for discharge of exhaust gas from the cylinder, the system including;

a fuel injector having a body and an end region from which fuel is delivered, for delivering fuel;

a passage separate from the inlet port extending between the injector and cylinder for delivering fuel from the injector and idle air to the cylinder; and means for heating the end region of the injector to thereby heat fuel in the end region before the fuel is ejected from the injector, so that as soon as the fuel is ejected from the injector, the fuel converts to vapour state and is maintained in a vapour state as the fuel travels along the fuel passage from the injector to the cylinder.

The smaller passage, in one embodiment of the invention, extends for only part of the distance between the injector and the cylinder and has a first end which is arranged adjacent the end region of the injector and a second end which communicates with the inlet port so that the vaporised fuel initially passes through the small passage and then into the inlet port for mixture with combustion air drawn into the inlet port by suction of the engine.

In one embodiment of the invention the heating means comprises a heat exchanger for heating the idle air prior to delivery of the air to the end region of the injector and the passage.

Preferably in this embodiment of the invention the idle air is mixed with exhaust gas discharged from the cylinder so as to further heat the air so that the heated air and exhaust gas mixture is supplied to the end region and the passage.

Preferably the system includes an idle air supply tube extending from an idle solenoid to the heat exchanger and connecting with a heat exchanger tube within the heat exchanger, the heat exchanger tube being connected to a hot gas return tube, means for delivering exhaust gas into the hot air return tube so that the exhaust gas mixes with the idle air to heat the idle air, the return tube being coupled to supply the exhaust gas and idle air mixture to the fuel delivery element so that the heated idle air and exhaust gas mixture envelope the fuel delivery element to heat the fuel delivery element and so that fuel delivered by the fuel delivery element travels with the heated idle air and exhaust gas mixture through the passage.

In one embodiment of the invention the passage includes a swirler for causing the idle air, exhaust gas and fuel mixture to swirl and thoroughly mix as it travels along the passage to the cylinder.

In one embodiment of the invention the hot air return tube is coupled to a distributor tube, the distributor tube having a plurality of outlets each corresponding to one of a plurality of fuel injectors for supplying the exhaust gas and/or idle air mixture to the fuel delivery elements to mix with fuel supplied by the fuel delivery element.

In one embodiment of the invention the passage comprises a tube for installation in the inlet port of the engine, the tube having a cross-sectional area and volume which is smaller than the cross-sectional area and volume of the inlet port.

Preferably the fuel injector is located in a bore in the head of engine, the bore communicating with the distributor tube and also the fuel and air delivery tube.

In another embodiment of the invention the tube can be integrated into the head of the engine rather than provided as a separate tube installed in the inlet port of the engine.

Preferably the idle air supply is provided by an idle air transfer block for installation between the idle air solenoid and throttle valve body, the block having a first bore which communicates with an inlet opening for delivery of idle air and the block having a second bore which communicates with a conduit through the idle air solenoid and connects with the idle air supply tube. In this arrangement the idle air opening on the downstream side of a butterfly valve of the throttle body is blocked off so idle air cannot enter the engine other than through the idle air supply tube.

In a further embodiment of the invention the heat exchanger is formed by part of the passage which, in use, is exposed to exhaust gas discharged from the cylinder, the passage passing through the block to the inlet port of the engine.

Preferably the passage passes through a bore extending from the exhaust port to the inlet port of the engine.

In this embodiment the passage communicates with a spacer block having a bore, the bore communicating with a distributor tube which is coupled with the idle air supply tube for receiving the idle air.

In one embodiment the injector is located in the distributor tube with the end region in heat conducting contact with the distributor tube to thereby heat the end region, the injector delivering fuel into the bore of the spacer block so that the fuel mixes with air supplied by the idle air supply tube and then passes through the passage to the inlet manifold and cylinder of the engine.

In this embodiment, the distributor tube and spacer block are coupled on the exhaust manifold of the engine, which provides a very hot heat source for heating the end region of the injector, and the delivery of idle air to the distributor tube not only provides combustion air, but also provides a cooling effect to the end region to prevent the end region from overheating.

Preferably the passage is provided with an opening for allowing exhaust gas to pass into the passage so as to maintain the fuel vapour and air travelling along the passage.

In another embodiment the distributor tube is insulated from the spacer block, and the idle air supply tube extends through a heat exchanger for location on the exhaust manifold of the engine to heat the portion of the air supplied to the distributor to heat the end region of the injector.

Once again, in this embodiment of the invention the passage can be in the form of a tube which is installed in the exhaust port and extends through the bore in the head to open into the inlet port of the engine. However, the tube could be formed as an integral part of the bore by casting or otherwise drilling the tube into the head of the engine.

A further aspect of the invention may also be said to reside in a fuel delivery system for an internal combustion engine having at least one cylinder and a piston mounted for reciprocating movement in the cylinder, the system including;

an injector for directing fuel into the cylinder so that fuel is deposited on the piston in the cylinder to cause vaporisation of the fuel before the fuel is ignited.

Preferably the fuel is heated prior to delivery of the fuel into the cylinder and onto the piston.

Preferably the heater comprises a heat exchange means which is heated by exhaust gas from the engine and wherein a fuel line extends through the supply of exhaust gas so that fuel passing through the fuel line to the injector is heated by the exhaust gas.

However, in other embodiments the heat exchanger may utilise hot water supplied by the engine or electric heating to heat the fuel line and fuel passing through the fuel line to the injector.

Preferably the injector is arranged in a side wall of the cylinder.

Preferably the side wall includes a hole and a sleeve is arranged within the hole, the injector being arranged within the sleeve.

Preferably the sleeve includes an outlet aperture which extends from the hole to the interior of the cylinder.

Preferably the side wall of the cylinder comprises a portion of the block in which the cylinder is located and the hole is formed in the block wall partly through the block wall, the hole communicating with a reduced diameter bore which extends from the hole to the cylinder, and the sleeve includes a hollow stem which locates in the reduced diameter bore so that a tip of the fuel injector can locate in the stem for injecting fuel into the cylinder and onto the piston.

Preferably the sleeve tapers from an inner most end to an outer end so that the outer end is wider than the inner end so that injector of different size can be located in the sleeve whilst ensuring that an end region of the injector is adjacent an end of the sleeve closest to the interior of the cylinder.

Preferably the end region of the injector is heated by condensation from the cylinder wall or engine block wall to vaporise the fuel immediately the fuel is ejected from the injector.

The invention also provides a fuel delivery system for delivering petroleum or gasoline type fuel to an internal combustion engine having at least one cylinder, a piston for movement in the cylinder, an air inlet port for delivery of air into the cylinder, and an air exhaust port for discharge of exhaust gas from the cylinder, the system including:

a fuel injector having a body and an end region formed from a heat conducting material so that when the end region is heated, heat is conveyed to fuel within the end region of the injector to heat the fuel in the end region of the injector;

a chamber provided about the end region of the injector, the chamber having an inlet and an outlet, the injector end region having a part which extends out of the chamber to communicate with an inlet port of the engine, and the chamber being sealed from the inlet port of the engine; and a hot fluid delivery means for delivering hot fluid to the chamber so that the hot fluid can circulate through the chamber and then exit the outlet, and wherein the hot fluid is for heating the end region of the injector within the chamber so that the heat is conducted through the end region to the fuel in the end region to heat the fuel in the end region, so that as soon as the fuel is ejected from the injector, the fuel converts to vapour state because of thermal expansion of the heated fuel, immediately the fuel is ejected from the injector.

The invention also provides a fuel delivery system for an internal combustion engine having at least one cylinder, a piston for movement in the cylinder, an inlet port for delivery of air into the cylinder and an exhaust port for discharge of exhaust gas from the cylinder, the system including:

an outer housing for receiving an end region of a fuel injector;

a first seal for sealing the end region of the injector to the housing when the injector is located in the housing;

a second seal for sealing the end region of the injector to the housing when the injector is located in the housing, so that a chamber is defined between the housing, the first seal, the second seal and the end region of the injector;

an exhaust gas delivery tube connected to the housing and communicating with the chamber formed when the injector is located in the housing;

an exhaust gas return tube communicating with the chamber formed when the injector is located in the housing, the exhaust gas delivery tube and the exhaust gas return tube having an exhaust gas entry end and an exhaust gas exit end respectively; and an exhaust flange for connection to an exhaust system of the engine, the exhaust gas entry end and the exhaust gas exit end of the exhaust gas delivery tube and the exhaust gas return tube respectively, being coupled to the exhaust flange so that exhaust gas which passes through the exhaust flange can enter the exhaust gas delivery tube, flow through the chamber and return through the exhaust gas return tube to the exhaust system of the engine to heat the end region of the injector when the injector is located in the housing.

Preferred embodiments of the invention will be described, by way of example, with reference to the accompanying drawings in which.

Figure 1:
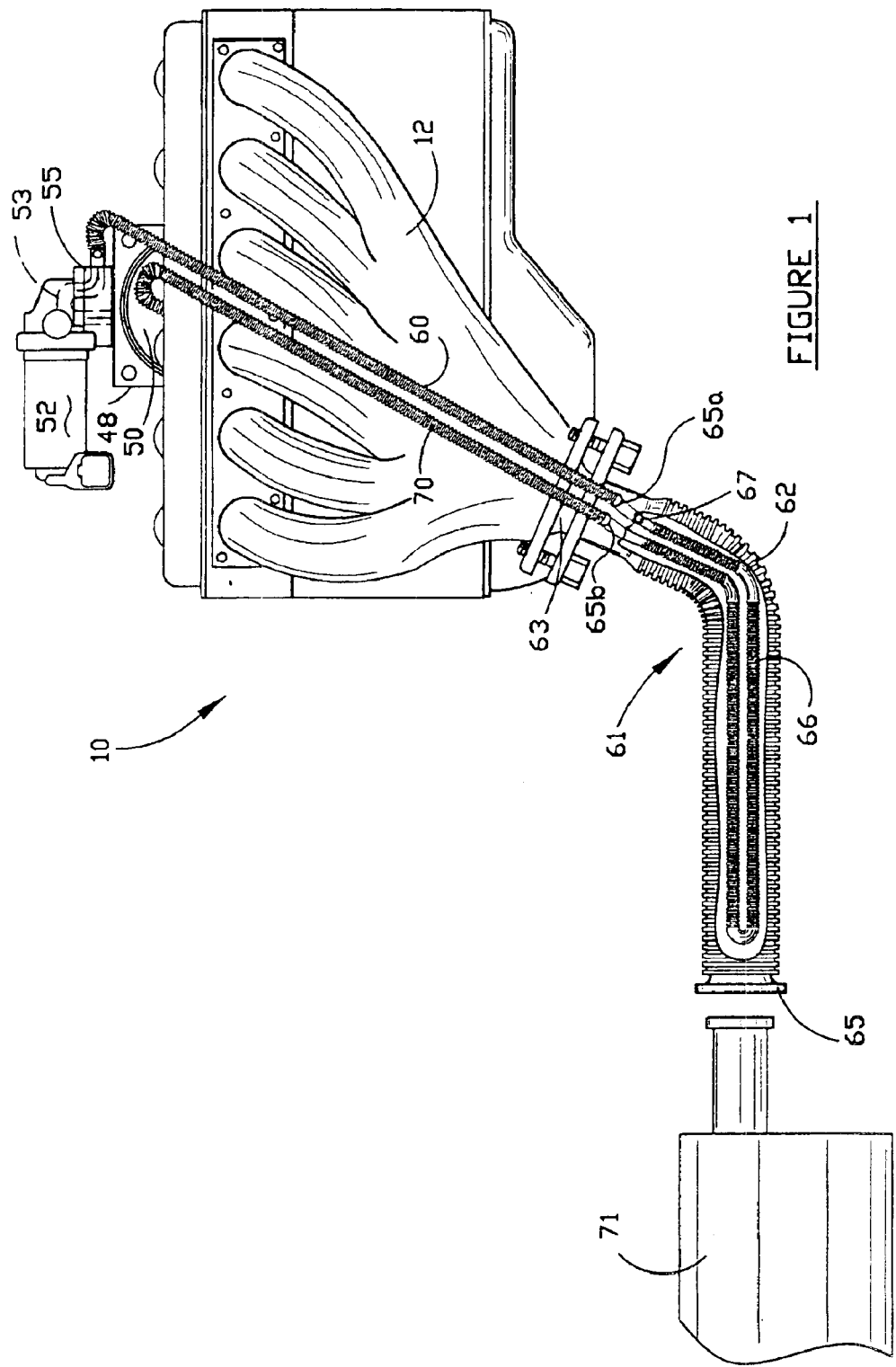
FIG. 1 is a side view of an engine including a fuel delivery system according to one embodiment of the invention.
Figure 2:
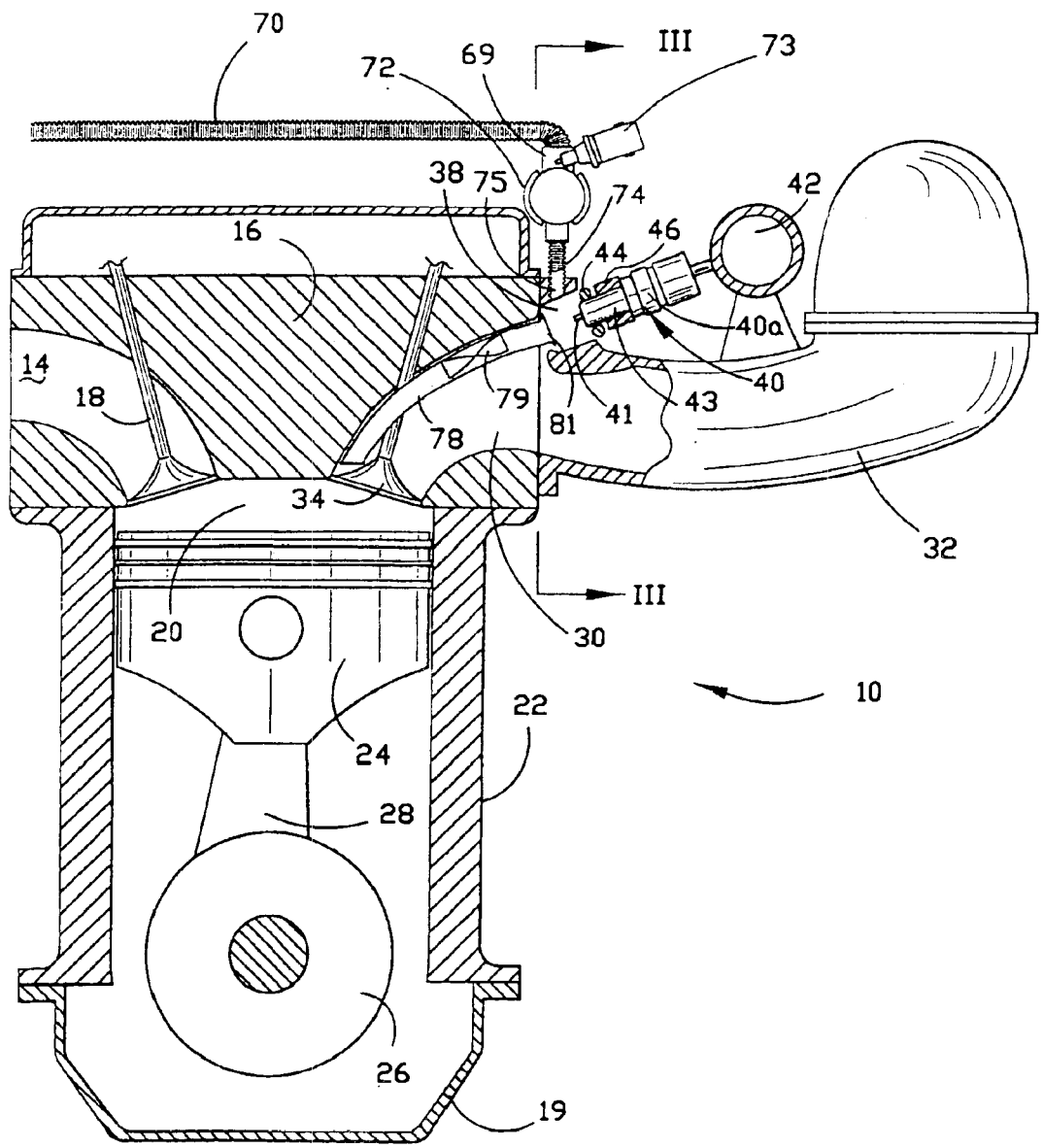
FIG. 2 is an end view of part of the system of FIG. 1.
Figure 3:
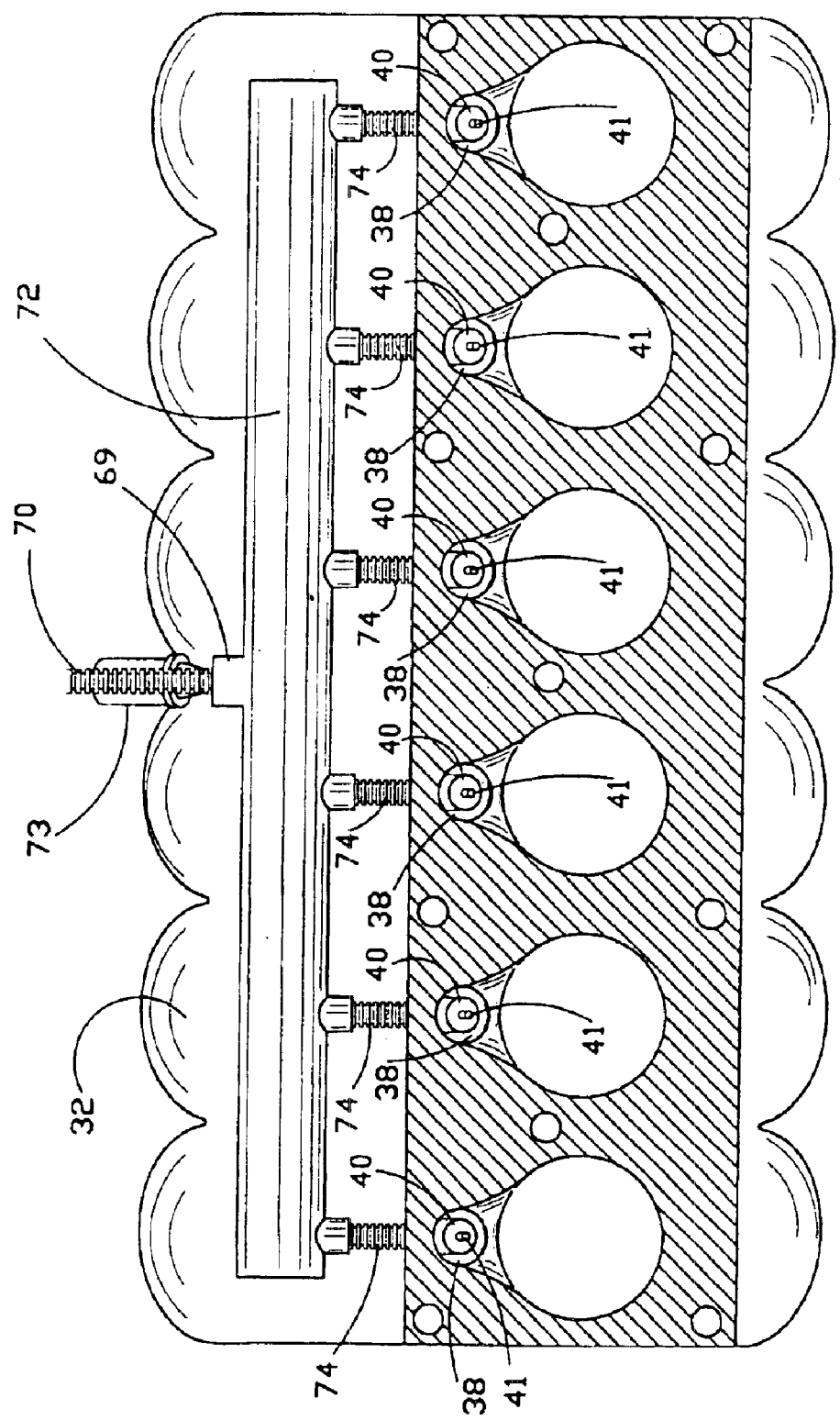
FIG. 3 is a view alone the line III—III of FIG. 2.

With reference to FIGS. 1 to 4 which show a first embodiment of the invention, an engine 10 is schematically shown which in the embodiment shown is a six cylinder engine and which operates in the conventional fashion apart from incorporation of the fuel delivery system according to the first embodiment of the invention. As is best shown in FIGS. 1 and 2 the engine includes an exhaust manifold 12 which connects with exhaust ports 14 (only one shown in FIG. 2) arranged in the head 16 of the engine 10. An exhaust valve 18 is provided for opening and closing the port 14 for allowing exhaust gasses to escape from cylinder 20 which is arranged in cylinder block 22. As is conventional a piston 24 is arranged in the cylinder 20 and is connected to a crank shaft 26 by a connecting rod 28. A sump 19 closes the bottom of the engine as is conventional.

The head 16 also has an inlet port 30 which connects to an inlet manifold 32 for the delivery of air to the cylinder 20. An inlet valve 34 is arranged in the inlet port 30 for selectively allowing entry of fuel and air into the cylinder 20. As is conventional, the fuel and air delivered into the cylinder 20 can be ignited by a spark plug (not shown), or by compression in the case of a diesel engine, in the conventional manner.

The inlet manifold 32 includes a bore 38 in which a fuel injector 40 is located. As is conventional, a fuel injector 40 is provided for each of the cylinders of the engine and only one is shown in the end view of FIG. 2. A fuel supply 42 delivers fuel to the injectors 40 in the conventional manner.

In this embodiment of the invention the injector 40 is located in the bore 38 in a more rearwardly position than that which would be conventional in an internal combustion engine. The reason for this will be apparent from the following description. In order to mount the injector 40 in a more rearward position the seals which surround a conventional injector for sealing the injector within the bore 38 are removed and replaced by a larger seal 44 and 46 located at the base of the injector so that the injector 40 sits more rearwardly with respect to the cylinder 20 than is conventional. However, as is apparent from FIG. 2, an end region 43 of the injector 40 from which fuel is delivered is arranged in the bore 38 so that fuel can be delivered from the injector 40 to the cylinder 20. The end region 43 may have a tip 41 from which fuel is delivered, or the fuel can be delivered direct from an end surface of the end region 43 via holes (not shown) in the end surface.

Furthermore, the injector 40 is a conventional injector, except that the usual casing components around the end region 43 are removed to expose the end region 43. The end region 43 is formed by the metal shaft of the conventional injector so that the metal end region 43 can be heated, as will be explained in more detail hereinafter, to heat the fuel in the end region 43.

As is shown in FIG. 1 a throttle body 48 supports a butterfly valve 50 for controlling air flow into the manifold 32. An idle solenoid 52 is mounted for controlling the flow of idle air around the butterfly valve 50. In a conventional fuel delivery system the idle solenoid 52 includes an air passage 53 which bypasses the butterfly valve 50 so that when the butterfly valve 50 is closed (ie that is when the engine is idling) air is delivered around the butterfly valve 50 for supporting combustion of fuel in the engine.

In the first embodiment of the invention the idle solenoid 52 is not directly mounted on the throttle body 48. Rather, and idle block 55 is provided between the idle solenoid 52 and the throttle body 48.

Figure 4:
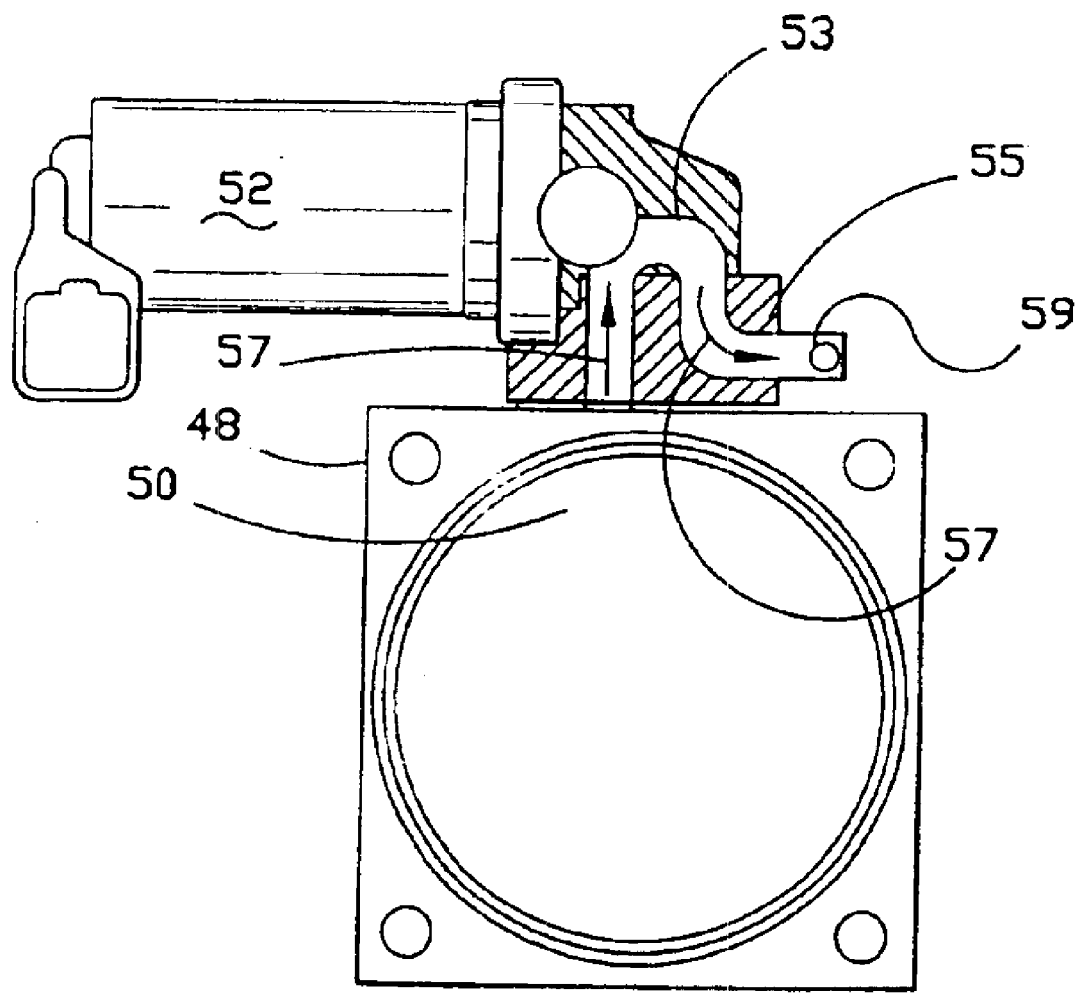
FIG. 4 is a diagram illustrating idle air delivery according to the first embodiment of the invention.

As is best shown in FIG. 4 the block 55 has a first passage 57 which communicates with the air inlet from the throttle body 48 and the passage 53 in the idle solenoid 52. The block 55 includes a second passage 57 which also communicates with the passage 53 and which connects with an idle air supply tube 60 (see FIG. 1) via a connector 59.

The idle air return hole which would normally convey air from the passage 53 to the downstream side of the butterfly valve 50 is blocked off in the throttle body 48 because it is not used in this embodiment of the invention.

Returning to FIG. 1, the exhaust manifold 12 would normally connect to an exhaust system 71 of the engine for delivering exhaust gasses from the manifold 12 to atmosphere. However, in this embodiment of the invention a heat exchanger 61 which includes a heat exchange pipe 62 is interposed between the manifold 12 and the exhaust system 71. The pipe 62 includes flanges 63 and 65 which can couple direct with original flanges on the outlet manifold 12 and the flange on the exhaust system 71.

The idle air supply tube 60 extends into the pipe 62 through a hole 65a in the side wall of the pipe 62 and connects with a heat exchanger tube 66 within the pipe 62. The heat exchanger pipe 66 extends within the pipe 62 as is clearly shown so that heat exchange can take place between hot exhaust gas passing through the pipe 62 to the exhaust system 71 and the idle air which is flowing through the idle air tube 60 and also through the heat exchanger tube 66 within the pipe 62. The heat exchange tube 66 includes an inlet hole 67 so that exhaust gas can flow into the pipe 66 to mix with the idle air as will be described in more detail hereinafter. A hot air return tube 70 is connected to the other end of the tube 66 and exits the pipe 62 through a hole 65b in the wall of the pipe 62. The hot air tube 70 (as is best shown in FIG. 2) extends to a distributor tube 72 via an inlet boss 69 on the tube 72. An air temperature sensor 73 is provided for measuring the temperature of the air which enters the distributor tube 72.

The distributor tube 72 has six drop tubes 74 (all six being shown in FIG. 3) extending downwardly from the distributor tube 72. Each drop tube 74 communicates with a bore 75 drilled in the inlet manifold 32 and which communicates with the bore 38 in which the injector 40 is located. As is best shown in FIG. 2, the tubes 75 register approximately with the outlet tip 41 of the injectors 40.

Each of the inlet ports 30 is provided with fuel and air delivery tube 78. The tube 78 extends from the bore 38 slightly downstream of the injector tip 41 to just above the inlet valve 34 in each inlet port 30. A swirler 79 is arranged in each tube 78 and has the form of a spiral strip of metal for causing air and fuel mixture passing through the tube 78 to swirl to facilitate complete mixing and contact of air, fuel and exhaust gas as will be explained in more detail hereinafter.

The tube 78 is sealed in the bore 38 and has a generally flared end 81 so as to enable easy entry of fuel, air and exhaust gas mixture which is delivered into the bore 38.

In operation of the engine, idle air is drawn into the tube 60 through passage 57 in the block 55, through the passage 53 and then through the passage 57 in the block 55 where the air is delivered to the idle air supply tube 60. As is conventional, the idle air is drawn from the idle air solenoid 52 by suction in the engine when the pistons 24 are caused to reciprocate in the cylinders 20 by cranking of the engine or by normal operation of the engine. The idle air passes through the tube 60 and into the tube 66 where the air is heated by heat exchange between exhaust gas leaving the exhaust manifold 12 and passing through the pipe 62 to the exhaust system 71. Some exhaust gas is also drawn through the hole 67 in the tube 66 so as to mix with the idle air and be delivered to the distributor tube 72 via the hot air return tube 70. The hole 67 preferably is dimensioned so as to provide a 10% to 20% exhaust gas component of the gas which is delivered through the tube 66. Thus, the ratio of exhaust gas to idle air passing through the idler air tube 60 is from 10% to 20% exhaust gas and from 90% to 80% idle air. However, the idle air supplied is always sufficient to operate the engine at idle speed. The hole has a countering vacuum effect which, using the directional flow of the exhaust gas passing through the pipe 62, allows the intake vacuum which is determined by engine speed and load to control the amount of exhaust gas drawn through the hole 67 within the preferred range of ratios referred to above. The mixture of exhaust gas and idle air which enters the distributor tube 72 is provided to each of the drop tubes 74 so that idle air and exhaust gas mixture is delivered to the bores 38. The idle air passing through the tube 66 is heated by heat exchange with the exhaust gas travelling the pipe 62 and further heated by the incorporation of some of the exhaust gas which passes through the hole 67 into the tube 66. The heat of the gas mixture delivered to the distributor tube 72 is preferably about 80° C. to 120° C. and most preferably about 100° C.

The hot gas is delivered from the drop tube 74 and the bore 75 to the bore 38 so as to impinge on the end 43 of the injector 40 and the tip 41 of the end 43 of the injector 40. This heats the end 43 and tip 41 of the injectors 40 (which, as previously explained, are made from metal). The heating of the end 43 and tip 41 of the injectors 40 raises the temperature of the fuel in the end region 43. The fuel is able to be heated in the end region 43 of the injector but maintains a liquid state due to the pressure that occurs in the injector. However, as soon as the injector is opened under control of the engine control unit, to eject fuel from the injector tip 41, there is an immediate change in state from liquid to vapour state because of the immediate reduction in pressure which occurs as the fuel leaves the tip 41. The transformation from the liquid to vapour state is a flash off effect so that the fuel immediately vaporises because of the heated condition of the fuel in the end region 43 and the decrease in pressure which occurs as soon as the fuel leaves the tip 41. Thus, the fuel is immediately vaporised upon leaving the tip 41. The vaporised fuel which is created immediately upon the fuel leaving the tip 41 mixes with the hot intake air and exhaust gas mixture delivered from the distributor 72 to maintain the fuel vapour created from the flash off effect in the vapour state, as the fuel moves away from the injector tip 41. As the fuel moves further away from the tip 41, the fuel in vapour state begins to disperse into the hot air and exhaust gas mixture. Some cooling of the mixture may occur, particularly if the mixture is allowed to mix with intake air from the inlet manifold 32 prior to delivery to the cylinder 20 (as occurs in embodiments to be described hereinafter). However, because the fuel has been maintained in the vapour state, and is dispersed into the intake air, the fuel will not tend to condense and return to a liquid state because it has become dispersed throughout the air and exhaust gas flow to the cylinder and, although some cooling may take place, the mixture is held at a higher temperature than would be the case if no hot air and exhaust gas was mixed with the vapour. In any event, in order to ensure that the fuel is delivered as vapour to the cylinder, it is necessary to ensure that the fuel is converted to vapour state immediately upon injection from the injector tip 41 and that the vapour state is maintained immediately after ejection until the vapour disperses into the gas flow to the cylinder. Once the vapour has dispersed into the gas flow, it is very unlikely to condense because of its dispersion in the gas flow and the short amount of time it takes for the vapour and gas mixture to travel to the cylinder 20. Thus, the heating of the end region 43 ensure that immediately upon ejection of fuel, the ejected fuel flashes into a vapour state and mixes with the hot air and exhaust gas, thereby maintaining the vapour state until the fuel vapour disperses into the gas flow. This contrasts greatly with prior art techniques which eject the fuel in liquid state and then attempt to convert the liquid state into a vapour state after the fuel has travelled some distance from the injector.

As the volume of intake of hot gas alters with different throttle positions of the engine from idle to full throttle, causing varied pressure alterations in the inlet system, the ratio of heated gas to normal air charge intake alters. Consequently, the air fuel mixture ratios can be altered respectively. For example, a leaner mixture is possible at lower speeds and load factors, as against higher loads and engine speed. Generally the fuel air ratio will operate, in accordance with the preferred embodiments of this invention, well above Lambda 1.00, which is the recognised industry optimum standard for a normal engine set, as is presently understood. At lower engine speeds and load factors, there is less dilution of the heated gas, as there is less throttle opening and therefore less intake air from the standard source, which operates at a lower ambient temperature, due to the starting temperature at which it is inducted into the inlet system, and the velocity of that intake air, as air becomes cooler the faster it travels. Therefore, a hotter combined mix is delivered to the cylinder. This adds to the ability to burn leaner mixtures with regard to the adverse effect of combustion and exhaust temperatures as they are countered by the combustion of hotter intake temperatures and exhaust gas recirculation. The introduction of a heated gas mixture into the combustion chamber in itself produces lower combustion temperatures. This, combined with the inclusion of exhaust gas an inert gas, forms a system by which those normally produced high combustion temperatures from lean burnt engines are controlled. The temperature of intake air due to a lower density, produces a lower compression resistance from the opposing pistons, to assist in maintaining and improving the low speed torque and power from the engine with a lot less fuel as measured by an increased Lambda setting in the area of 1.25.

As the load and engine speed increases, the intake temperature alters due to the ratio of hot gases to normal ambient temperature intake air, as the throttle is being opened more and allowing more air into the inlet system. The total intake charge temperature decreases, and thereby increases the density which is required to maximise the power output. This also increases the compression resistance within the engine itself, adding to the energy that will be absorbed in the operation of the engine, thereby requiring a fuel air mixture ratio with a greater balance of fuel to air to compensate loads, speed, resistance, but still allowing a far leaner mixture to be used than an engine operating in a conventional fashion. The warmer intake temperature reduces the combustion temperatures, which aids in countering the effect of lean burn.

A further effect of recycling the exhaust gas aids in reducing the combustion temperatures and allows further lean burning, which is the cause of the dramatic temperature increases when fuel is reduced in a conventional system. Exhaust gas recirculation aids in reducing the NOx, which is another adverse consequence usually associated with lean burn as, under normal circumstances, an engine that is lean burn increases nitrous oxides dramatically. The lower air density reduces the compression resistance which allows the engine to maintain its power and torque with a lesser fuel intake in total or in a given cycle. The preferred embodiments of the present invention allow 100% vaporisation of fuel immediately after injection occurs by heating the fuel in the end region of the injector. This maintains the integrity of the components for longevity and simplicity of installation or incorporation at original equipment manufacture level. The hot fuel under pressure in the injector is released into a hot ambient intake temperature, and flashes off to form a vapour, due to the thermal expansion of the liquid once the pressure is reduced when the injector fires. This vapour travels through the intake area for a short distance and is maintained as a vapour as it travels in the hot exhaust gas and/or hot combustion air, and it finally mixes with other and normal intake air streams whereupon the vapour is further dispersed with the normal intake air stream to formulate a combined air charge of varying temperatures dependent on loads and engine speed. The dilution of the hot gases and fuel vapour mixture prevents it recondensing at any stage after the flash off effect immediately after injection where the vapour is formed. The reduced fuel used by the engine, as demonstrated by the Lambda settings is achieved by both the reduction of fuel because of the creation of vapour and subsequent lesser liquid fuel requirements to form the appropriate fuel air mixture ratio after vapour is formed, plus the fact that the preferred embodiments of the invention allow lean burnt engines due to the introduction of exhaust gas and a hotter total air charge.

The introduction of vapour in place of a vapour and liquid fuel combination in the cylinder brings a further complementary addition for both power and efficiency from the igniting of that vapour and its ability to burn. The liquid fuel does not ignite, it is wasted and expelled as pollutants without positively effecting the efficiency of the engine.

The greater the amount of vapour in the cylinder for ignition, the greater the compression ratios that can be achieved by reducing the capacity of the combustion chamber or, in other words, the given area for which the combustible mixture is compressed into. The vapour mixture ignites with a greater amount of force and power without the pre-ignition or multiple detonations and flame fronts that appear as engine knock or pinging that occurs with conventional high compression engines using petrol.

Once fuel is utilised at this higher compressed rate, its burn rate or rather, the speed or the time taken to complete the burn of the entire mixture in the combustion chamber is reduced, meaning that more of the combustible mixture can be more effective as it is burnt in the most effective part of the compressing stroke where that compression is greatest, this coupled with the fact that more of the total mixture is burnt which effects a change in the emissions and is indicated with higher carbon dioxide readings, and lower hydrocarbons and carbon monoxide, being the normal way of assessing the efficiency of any ignition in the combustion chamber.

The sped up burn rate means that less timing advance would be needed to ensure that a greater amount of vapour is burnt in each cycle.

Conventional engines rely on igniting the fuel air mixture before the piston reaches top dead centre (when the piston is located at the top of the engine cylinder in each given cycle or rotation) in order to have sufficient time to burn as much of the fuel as possible before the piston starts its downward movement or power stroke due to that detonation that has just occurred.

This current way of trying to ensure a more complete burn is in principle counter-productive as the ignition process is started whilst the piston is still compressing thereby working against itself by having two opposing forces, firstly the detonation which is pushing against the upwardly or compressing movement of the piston, and until the piston passes top dead centre and commences its downward travel being the power stroke, the detonation is not productive.

Further to this format of ignition, the mixture is actually ignited without reaching its optimum compression. This then means that a retarded timing can effect a lower combustion temperature due to the better pressure in the chamber and better burner qualities as a compressed vapour. This provides further control of the combustion temperature and the subsequent control of fuel air ratios to effect further lean burn without the adverse effects of lean burning temperatures.

Vapour induction into the combustion chamber has another aspect with regard to the overall performance of an engine. In a conventional engine, when larger amounts of fuel are injected to transfer rate of liquid to gas is limited due to time constrains and saturation of that intake air to a point where it is unable to facilitate a transfer of liquid to the vapour or gas, then what occurs is a negative effect on the combustion mixture whereby the spark from the sparking plug can be extinguishes and prevent proper, or any type of ignition at all, or if there is any ignition, then it will be poor and incomplete as the larger quantities of liquid fuel act to put the flame from the ignition out.

However, when the principles of the present invention are utilised, then the mixture is introduced into the chamber, and subsequently compressed is already a gas and none of the above reactions will occur.

It will be understood from a consideration of the above discussion and FIG. 2 that the body 40a of the injector 40 is not adversely heated, thereby ensuring that the operating components within the body 40*a* are not destroyed or the body 40*a* is not melted. Furthermore, the heating of the fuel in the end region 43 to the required temperature occurs without the need to deliver very hot fuel to the injector 40*a* from the fuel rail 42, which would have the effect of melting the componentry in the body 40*a* or otherwise damaging the injector 40. Thus, the body 40*a* in which the operating components of the injector are located and into which the fuel is introduced can be maintained at normal temperatures, whilst the end region 43 is heated to the required temperature to elevate the temperature of the fuel in the end region 43 so that flash off and vaporisation of the fuel occurs immediately the fuel leaves the tip 41 of the injector 40.

Thus, in the embodiment of FIGS. 1 and 2, the fuel vapour which is created immediately upon ejection of fuel from the tip 41 mixes with the air and exhaust gas delivered into the bore 38 and passes into the vapour tube 78. The air, exhaust gas and fuel are caused to swirl by the swirler 79 as the mixture passes through the tube 78 to ensure thorough contact and mixing of the fuel with the hot air and exhaust gas mixture. This maintains the ejected fuel (which is normally in the form of droplets) in the vapour stole as it passes from one end of the tube 78 to the other end of the tube 78 adjacent the inlet valve 34. Additional air for supporting combustion of fuel in the cylinder 20 is provided through the air inlet manifold 32 and inlet port 30 in the conventional way. Thus, at idle speed only air fuel and exhaust passes into the cylinder 20 through the tube 78. However, once the accelerator is depressed and the butterfly valve 50 opens, air is able to pass through the throttle body 48 into the air inlet manifold 32 and then inlet port 30 for supply to the cylinder 20.

Rather than supply the idle air in the manner described above (via block 55), the idle air could be taken downstream of the butterfly valve 50. In this arrangement a block (not shown) is provided between the throttle body 48 and the manifold 32. The block would have a hole which communication downstream of the butterfly valve where idle air is normally fed, and joins the tube 60.

Because the fuel is delivered to the cylinder through the tube 78 which is small in area and volume compared to the inlet port 30 the fuel can be maintained heated and the temperature of the fuel maintained as the fuel passes from one end of the tube 78 to the other end of the tube 78.

In the embodiment shown in FIG. 2, the tube 78 extends all the way from the bore 38 to the inlet valve 34. However, in other embodiments, the tube 78 could extend only part of the way along the length of the inlet port 30 and open into the inlet port 30 a significant distance from the valve 34. In still further embodiments, the tube 78 could be done away with completely. The tube 78 is preferably the length shown in FIG. 2 in high performance or high revving engines, such as race cars or the like. In normal street cars the tube 78 is preferably much shorter and extends for about one-tenth of the length of the inlet port 30 from the bore 38. Thus, in this arrangement, the vaporised fuel and hot air and exhaust gas mixture enters the tube 78, travels along the tube 78 for the short distance of the tube 78 and then exit the tube into the inlet port 30 for mixture with the intake air sucked into the inlet port 30 from the inlet manifold 32.

Preferably the heat exchanger tube 66 within the pipe 62 is of such diameter and length so that it provides a heat exchange area equivalent to about 50 square inches of heat exchange area per one liter of engine capacity and with the diameter of the tube 66 representing the minimum flow area for the idle system of the vehicle. The size of the pipe 62 should be such that it maintains normal exhaust flow characteristics from the exhaust manifold 12. The pipe 62 can be covered with an insulating material so as to improve heat retention and therefore heat exchange with the tube 66.

The mixture of the exhaust gas with the idle air performs two functions. The first is to initially heat the cooler fast moving idle air which is travelling through the tube 60 so as to allow the heat exchanger formed by the pipe 62 and tube 66 to be as small as possible, and secondly to mix in the exhaust gas with the in take air stream to reduce the nitrous oxide in the emissions. The tube 66 preferably has a corrugated or stepped contour so as to create turbulent flow of the mixture through the tube 66 to cause thorough mixing of the idle air and the exhaust gas. The distance the injector 40 is arranged back from the inner most end of the bore 38 compared to conventional positioning of the injector 40 is in the order of 1 mm to 4 mm but the distance should be such that the tip 41 and end region 43 would generally be enveloped by the incoming heated gas from the drop tubes 74 and bores 75. The flared end 81 of the tube 78 not only facilities gathering of the gas and fuel mixture but also prevents the tube 78 from dropping into the engine and therefore facilities positioning of the tube 78 within the inlet port 30. The swirler 79 is preferably a tight fit in the tube 78 so it is held in place by friction and will not fall into the engine 10. The cross-sectional area of the vapor tube 78, as noted above, is smaller compared to the cross-sectional area of the inlet port 30 and inlet valve 34 and subsequently the velocity of the air mixture passing through the tube 78 is greater than that which would take place through the inlet port 30. This induces a greater amount of intake gas to pass the fuel vapour which is drawn through the tube 78 with the gas mixture thereby adding to the overall heat transfer to the vapour and therefore ensuring the fuel remains in a vapour state. This also provides a secondary vacuum system and allows the idle circuit to play a greater roll in supplying air into the engine when otherwise it tends to become overridden when the throttle is opened.

This effect changes the vacuum supplied to the sensors and fuel control systems and maintains a greater level of vacuum which in turn prevents the original amount of fuel being injected and reduces it in accordance with this embodiment. The vehicle's computer perceives a different set of operating parameters due to altered signals and so will reduce the amount of fuel required. To further alter the sensors perceptions the secondary vacuum system created by this embodiment can supply another source of vacuum to add to that original equipment, by the use of an added vacuum line to each required sensor.

As previously explained, heating the end region 43 below the electrical components which are contained in the body 40*a*, allows the electrical area contained in the body 40*a* to be cool and within operating specifications, because the fuel is supplied to the injector at normal temperature.

The heated fuel is able to be vaporised at a greater rate due to the warmer temperature of the fuel at injection time. This combined with the other features means that neither the fuel nor the heated gas needs to be any where near the end point temperature of fuel to obtain 100% vaporisation prior to ignition.

The increased average temperatures, of 80° C. to 120° C. plus, and temperatures not as severe as the end point temperature of fuel for both the intake gas, and the fuel, combined with the velocity, mixing in of exhaust gasses and length of time that the fuel is maintained in that combination in the vapor tube, produces fuel vapor and exhaust/intake gas mixture ready for ignition in the combustion chamber, reducing pollutants, carbons and increasing efficiency.

The use of minimal temperatures maintains the volumetric efficiency of the whole amount of inducted air.

Improvement economy is achieved by virtue of the fact that the fuel which is delivered to the cylinder 20 is in a completely evaporated state thereby resulting in less fuel requirement for the same performance. In conventional engines the amount of fuel directed to the engine by the fuel injector 40 is under the control of the engine control unit (not shown) of the engine 10. This unit will control the injector 40 in accordance with various operating parameters, as mentioned above, including air delivery temperature, engine speed, vacuum and the like. Because the present embodiment delivers vapor rather than fuel droplets to the cylinder 20 less fuel is required than the unit will determine for a particular operating condition. Thus, if the conventional unit is used with the preferred embodiment of the invention, the unit should be modified so as to cause the injector 40 to supply less fuel because, with this embodiment of the invention, less fuel is actually required than the unit will determine for a particular operating condition. This can be achieved by manually or automatically altering some the parameters delivered to the unit to cause the injector 40 to deliver less fuel. Alternatively, if the system is offered as original equipment, then the unit operating software is modified so that the injectors 40 deliver less fuel as is required by the embodiment of the invention to deliver the required performance characteristics.

Figure 5:
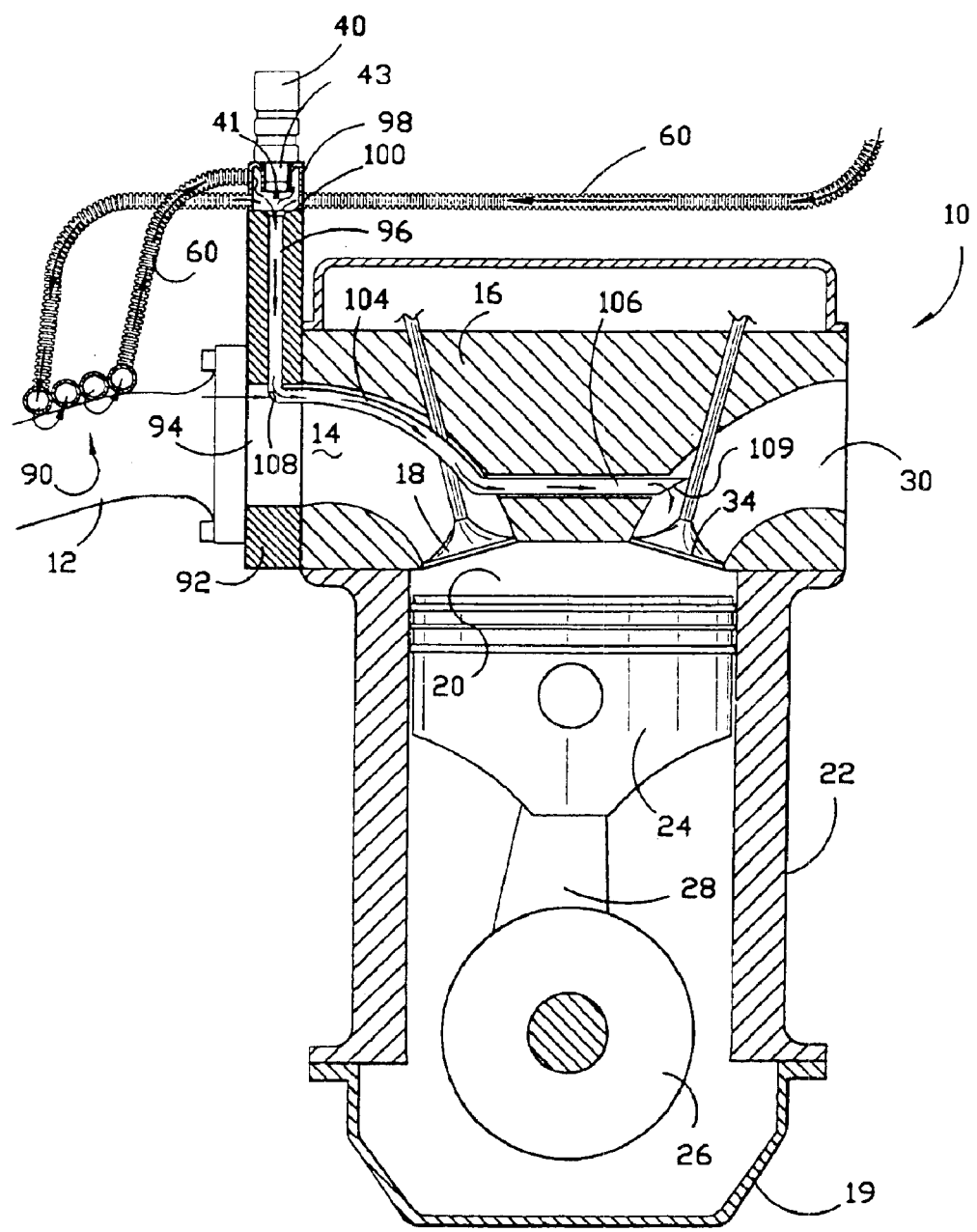
FIG. 5 is an end view showing a second embodiment of the invention.

FIG. 5 shows a second embodiment of the invention in which like references numerals indicate like parts to those previously described.

In this embodiment of the invention the idle air supply tube 60 is connected to a heat exchanger 90 which is located on the exhaust manifold 12. The heat exchanger 90 may include a pipe in S-shaped configurations which rest on the exhaust manifold 12 and is heated by heat from the exhaust manifold 12. The tube 60 can extend through the pipe so that heat exchange takes place to heat the idle air passing through the tube 60.

A spacer block 92 is connected to head 16 and has bores 94 which register with the exhaust port 14 and exhaust manifold 12 for allowing escape of exhaust gasses from each cylinder 20. The block 92 has vertically extending bores 96 drilled in it. One bore is provided for each of the cylinders 20 and the bores register with the exhaust ports 14 of the engine 10. A hollow distributor tube 98 is located on the top of the block 92 and the interior 100 of the tube 98 communicates with each of the bores 96. The idle air supply tube 60 includes a portion 60a which extends from the heat exchanger 90 to the distributor tube 98. Injectors 40 are mounted on top of the distributor tube 98 and have ends 43 and tips 41 which project into the hollow interior of the distributor tube 98. Heated air from the tube 60a passes into the distributor tube 98 and heats and surrounds the end 43 and tip 41 of the injectors 40, the heating of the end 43 and tip 41 causes the fuel to be vaporised as soon as it leaves the tip 41 in exactly the same manner as described with reference to FIGS. 1 and 2. Thus, the fuel vapour is created immediately upon injection and maintained in a vapour state as the fuel and hot gas travels along the bore 96.

In this embodiment the injector 40 is provided on the exhaust side of the engine, which is a much hotter environment than the inlet side at which the injector is located in the embodiment of FIGS. 1 and 2. Heating of the end region 43 is performed by the hot idle air passing through the tube 60a. In this embodiment, the block 92 may be insulated from the tube 98 or formed from a non-heat conducting material so that the end region 43 is not overheated, which may cause vaporisation of the fuel in the end region 43 which would result in the injector not operating properly. As explained previously, the end 43 is heated to a temperature so as to elevate the temperature of the fuel in the end region to a temperature at which the fuel is still maintained in liquid state because of the pressure within the end region 43, but as soon as the fuel is ejected from the end region 43, flashes to vapour, thereby ensuring that the injector 40 operates properly but the fuel is immediately vaporised upon leaving the tip 41 of the injector.

The bore 96 has connected to it a fuel and air delivery tube 104 which passes through the exhaust port 14 and through a bore 106 in the cylinder head 16. The tube 104 passes all the way through the bore 106 and into the inlet port 30 of the engine 10. The tube 104 is sealed in the bore 106 so that exhaust gas cannot pass through the bore 106 around the tube 104 to the inlet port 30.

Fuel vapour which is created upon ejection from the injector 40 mixes with the warmed air arriving from tube 60a and is delivered through each of the bores 96 to a corresponding one of the tubes 104. The air and fuel mixture passes through the portion of the tube 104 arranged in the exhaust port 14 so that the air and fuel is heated by heat exchange with the hot exhaust gasses exiting the exhaust port 14. This helps maintain the vapour stole of the fuel as it passes along the tube 104 to outlet end 109 which is arranged in the inlet port 30.

The tube 104 has an inlet hole 108 which is located in a part of the tube 104 in the exhaust gas flow from the port 14 to the manifold 12. As shown in FIG. 5 the hole 108 is located in the bore 94 in the block 92. However, the hole could be located in another part of the tube 104 provided that exhaust gas is able to pass into the hole 108 and mix with the air and fuel to further heat the air and fuel mixture in the tube 104. Thus, the fuel is caused to vaporise as in the earlier embodiment as it passes along the tube 104 to outlet end 109 and is delivered as vapor to the inlet port 30.

As in the previous embodiment the temperature of the air and exhaust gas passing through the tube 104 is in the range of 80° C. to 120° C. plus, up to an engine idle speed maximum temperature of 150° C. This embodiment has generally the same advantages as the previous embodiment in which a small quantity of the heated idle air and exhaust gas mixes with the fuel to maintain complete vaporisation as the fuel is delivered to the cylinder 20 through the inlet port 30. The remainder of the air which is required to support combustion of fuel within the engine 20 is provided through the inlet port 30 when the butterfly valve 50 (not shown in FIG. 5) is opened.

Figure 6:
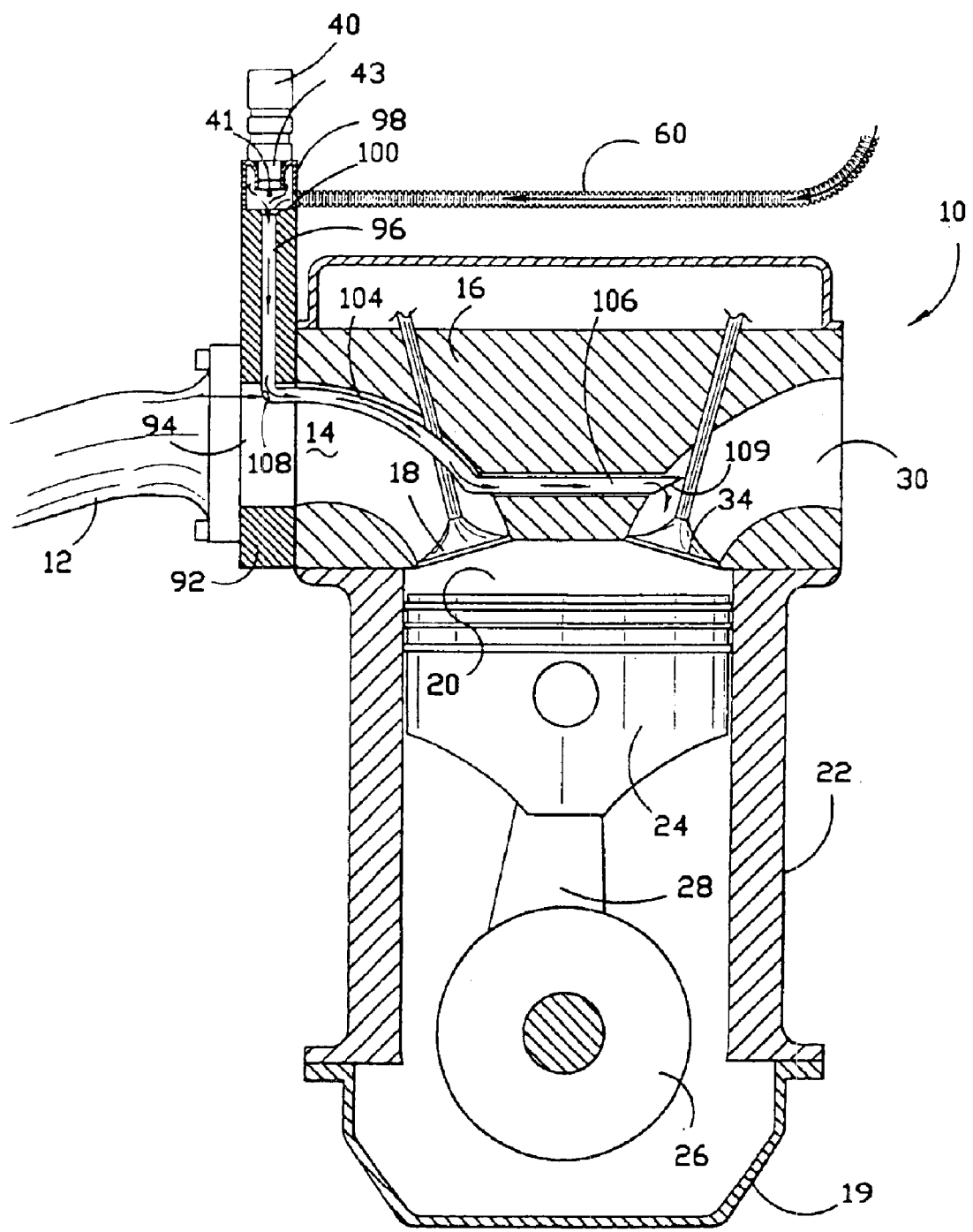
FIG. 6 is an end view showing a third embodiment of the invention.

FIG. 6 shows a still further embodiment of the invention which is generally the same as that described in FIG. 5 except that the tube 60 couples direct to the distributor tube 98 without going through any primary heat exchanger such as a heat exchanger 90 described with reference to FIG. 5. However, another important distinction over the embodiment of FIG. 5 is that in this embodiment the distributor 98 is in heat conducting relationship with the spacer 92, which in turn is in heat conducting relationship with the outlet manifold and outlet port of the engine. Thus, heat is conducted through the spacer block 92 to the distributor 98 to heat the end region 43 of the injector 40 because of the contact between the end region 43 and the distributor tube 98. Because the injector 40, tube 98 and spacer block 92 are on the exhaust side of the engine, which is the hottest part of the engine, the heat conduction to the end region 43 is significant, notwithstanding the relatively small amount of contact between the end region 43 and the distributor tube 98. The air 60 which passes directly from the idle solenoid not only provides idle air for combustion, but also some cooling of the end region 43 to ensure the end region 43 does not overheat. The idle air will be warmed as it enters the distributor tube 98 by heat conduction from the end region 43 as the idle air impinges on the end region 43, thereby maintaining the end region 43 at the required temperature to elevate the temperature of the fuel within the region 43 whilst maintaining the fuel in liquid state, but ensuring flash off into vapour state as soon as the fuel is discharged from the tip 41. Otherwise, operation of the embodiment of FIG. 6 is exactly the same as that in FIG. 5.

As shown in FIGS. 5 and 6 the end 109 of the tube 104 is preferably cut at an angle so as to increase the amount of vacuum in the tube 104 which is created by suction when the inlet valve 34 opens and air is drawn through the inlet port 30 into the cylinder 20.

Figure 7:
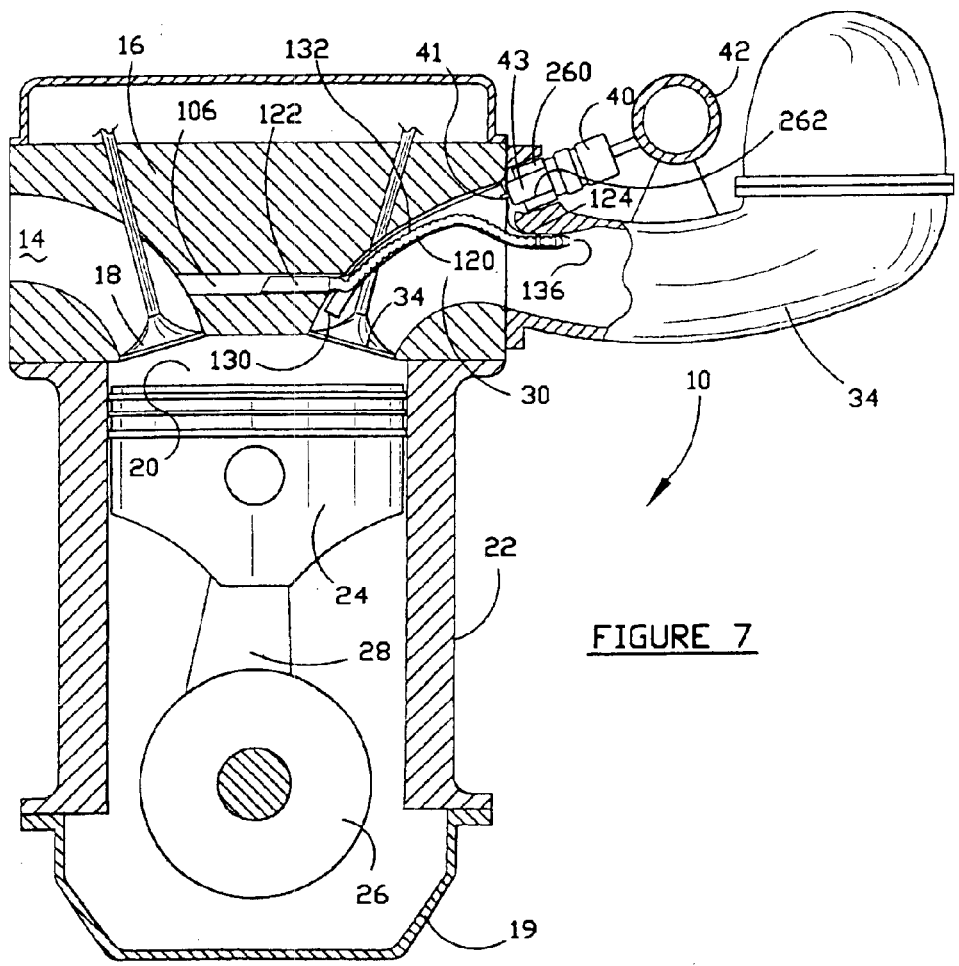
FIG. 7 is an end view showing a fourth embodiment of the invention.

FIG. 7 shows a still further embodiment of the invention which, once again, uses the same reference numerals to indicate like parts to those previously described.

In this embodiment of the invention the injector 40 sits in bore 38 in its conventional position compared to the position shown in FIG. 2 and the first embodiment of the invention.

In this embodiment of the invention the end region 43 of the injector 40 is received in a ring 260 which is described in more detail with reference to FIGS. 17 to 22. The ring 260 has a central opening 262 in which the end region 43 is snugly located so as to contact the peripheral wall of the central opening 262. The ring 260 is in heat conducting contact with the inlet manifold 32 so that heat generated in the head 16 and cylinder wall 2 is conducted through the inlet manifold 32 to the ring 260 and then to the end region 43 of the injector 40 to heat the end region 43. This elevates the temperature in the end region 43 so that the fuel is heated. Thus, when the fuel is ejected from the tip 41, the flash off effect previously described occurs so that the fuel is immediately vaporised.

According to this embodiment of the invention a bore 106 is formed in the head 16 which connects the exhaust port 14 with the inlet port 30. An air and fuel delivery tube 120 is located in the inlet port 30. The tube 120 has an exhaust gas inlet branch 122 which projects into the bore 106 and is sealed in the bore 106. The tube 120 also has an air inlet branch 124 which extends and opens into the inlet manifold 32. In this embodiment the idle solenoid and delivery of idle air is conventional with the air being delivered through the inlet manifold 32 and inlet port 30 in the usual way.

The air and fuel delivery passage has an inlet end 128 which registers with tip 41 of the injector 40 so that fuel ejected from the injector 40 passes into the inlet end 128 and can flow along the tube 120 to outlet end 130 which is positioned adjacent the valve 34.

Exhaust gas is able to pass from the port 14 through the bore 106 and into branch 122. A corrugated heat exchanger tube 132 extends from the branch 122 and into the branch 124 where it terminates adjacent open end 136 of the branch 124. The tube 132 is sealed in the branch 122 so exhaust gas is not able to flow past the tube 132 and directly into the tube 120. Exhaust gas which flows through the tube 132 heats the tube and therefore performs a heat exchange with fuel and air passing through the tube 120 from the injector 40 and branch 124 to end 130 to maintain the fuel in vaporised state in the same manner as described with reference to the earlier embodiments.

Figure 8:
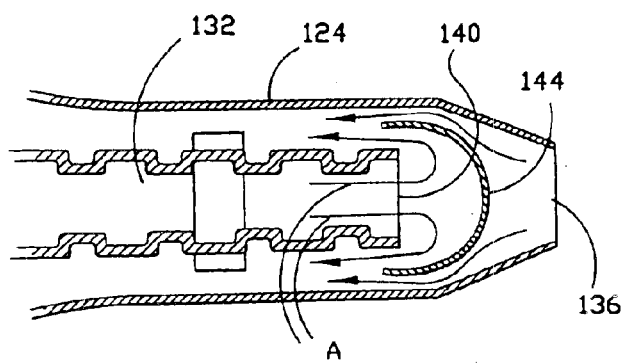
FIG. 8 is a more detailed view of part of the embodiment of FIG. 7.

Inlet air is able to pass through open end 136 of the branch 124 and then into the tube 120 so that it mixes with the fuel delivered from the injector 41. The mixture of air and fuel is heated by the heat exchange with the tube 132. The exhaust gas which passes through the tube 132 from the bore 106 exits outlet end 140 of the tube 132 (which is best shown in FIG. 8). Adjacent the outlet end 140 is a generally domed shaped baffle plate 144 which causes the exhaust gas exiting the end 140 of the tube 132 to be deflected as shown by arrows A back down the branch 124 away from the open end 136. Air in the inlet manifold 32 is also drawn through the open end 136 so the air mixes with the exhaust gas and fuel delivered from the injector 40 to also facilitate maintenance of the fuel in the vapour state as the fuel passes from the end 128 of the tube 120 to the end 130 of the tube 120. Thus, as in the earlier embodiments the fuel is delivered as vapor to the cylinder 20.

As in the earlier embodiments, in this embodiment the coverings around the end 43 of the injector 40 are preferably removed so the body 43 is heated by conduction from ring 260 and inlet manifold 32.

In the embodiments shown with reference to FIGS. 1 to 8, the fuel and air delivery tubes 78, 104 and 120 are shown as separate tubes which are installed into the inlet port of an engine. However, rather than provide separate tubes the tubes could be formed in the casting of the cylinder head or simply bored into the casting the cylinder head so that they are integral with and part of the originally manufactured cylinder head. The other tubes could also be internally formed with the engine rather than being provided as separate tubes if desired. Since the tubes take up very little space and connect to existing components of the engine the incorporation of the system into original equipment manufacture (i.e. that is manufactured engines) is simple to perform as is the conversion of a conventional delivery system on an existing engine by installing the various tubes as disclosed with reference to the earlier embodiments.

Figure 9:
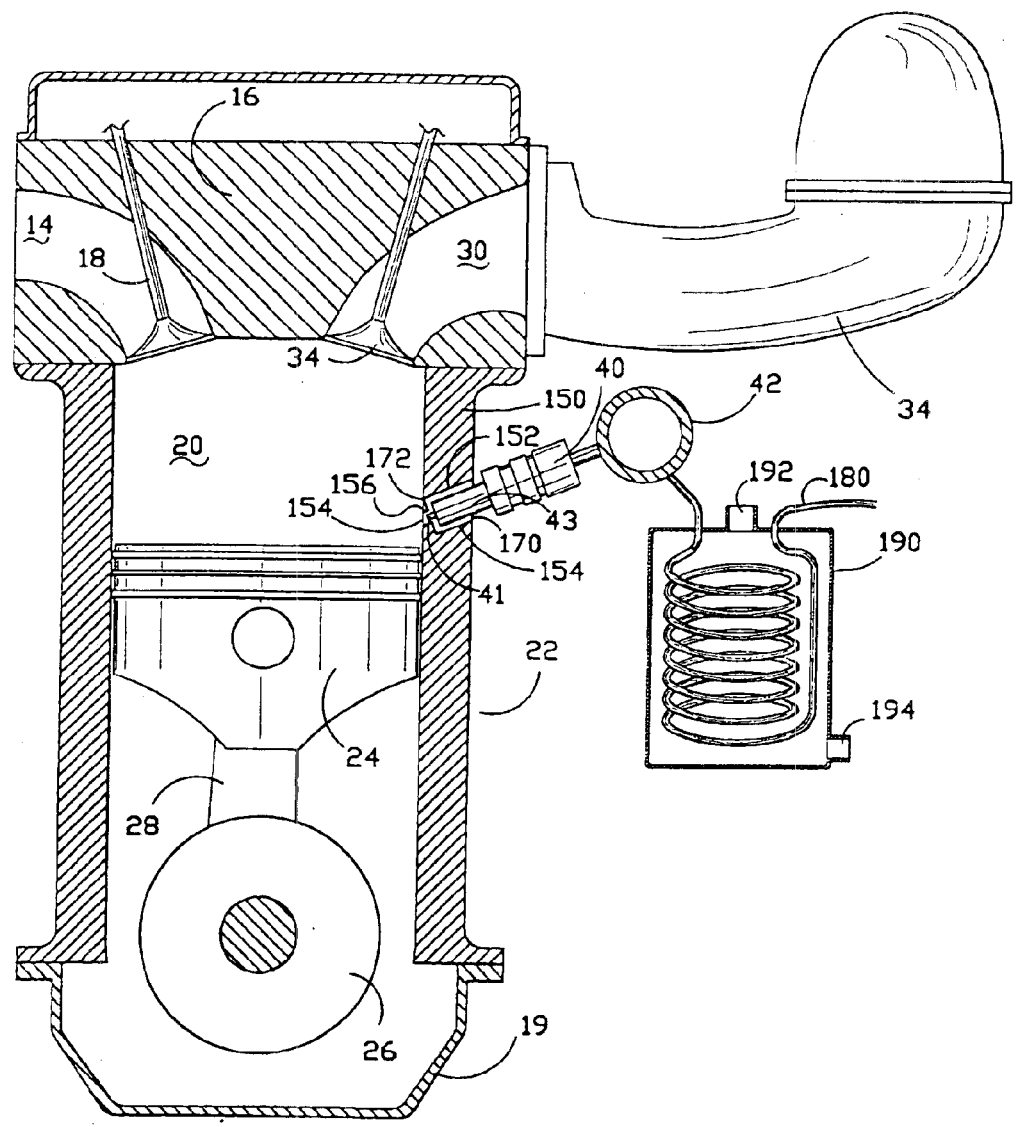
FIG. 9 is and end of a fifth embodiment of the invention.
Figure 10:
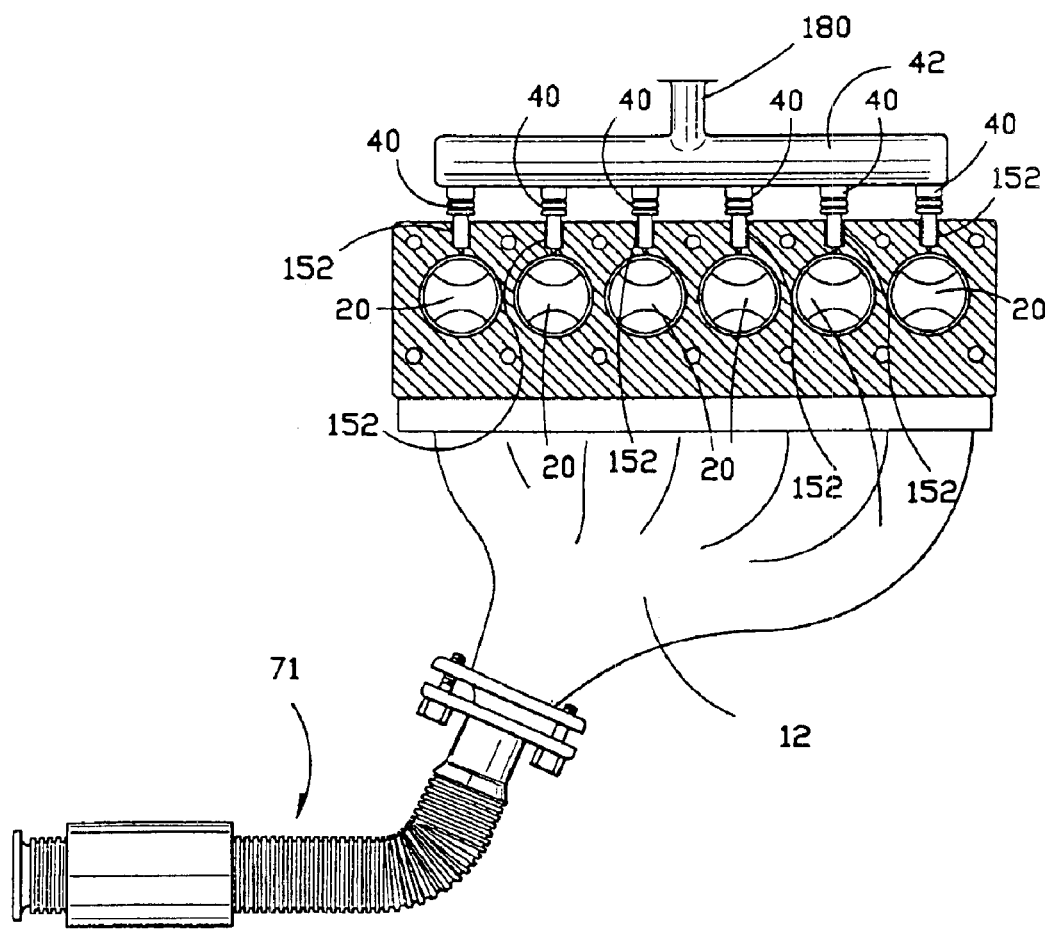
FIG. 10 is a top view of the embodiment of FIG. 9.

FIG. 9 and FIG. 10 show a further embodiment of the invention. In this embodiment block wall 150 which defines cylinder 20 is provided with holes 152. A sleeve 154 is inserted into each of the holes 152. Each hole 152 has a reduced diameter bore 154 which communicates the hole with the block wall 150 and the sleeve 154 has a stem 156 which projects into the hole 154. Injector 40 is located in the sleeve 154 and has tip 41 projecting into the stem 156 so that fuel can be injected directly into the cylinder 20.

Inlet valves 34 and outlet valves 14 are provided for controlling introduction of air and exit of exhaust gasses from the cylinder 20. Piston 24 reciprocates in the cylinder 20 in the conventional fashion.

The injector 40 is prepared in the same manner as described in the earlier embodiments in which the outer casing around the end region 43 is removed so the end region is in contact with the cylinder wall 150 via the sleeve 154. Thus, heat conduction can occur from the wall 150 to the end region 53 for heating the fuel in the end region 53 to achieve the same effect as described in the earlier embodiments. That is, the fuel, once ejected from the injector 40, will immediately flash off into the vapour state.

The timing of fuel injection from the injector 40 is retarded in this embodiment of the invention so that the fuel is ejected from the injector 40 directly onto the piston crown 24 as the piston 24 rises in the cylinder 20 so that the depositing of the fuel on the piston 24 will aid in the vaporisation of any unvaporised fuel before the fuel vapour is ignited in the cylinder by a spark plug (not shown) or by compression in the case of a diesel engine.

Thus, if any of the fuel is ejected from the injector in a liquid form, the fact that the fuel is ejected onto the crown of the piston 24 therefore vaporises that fuel before the ignition of the fuel, as is described above.

In the preferred embodiment of the invention the hole 152 in sleeve 154 taper outwardly slightly so that outer end 170 is slightly larger than inner end 172. This enables injectors 40 of different sizes to be inserted into the sleeve 152 with assurity that the tip 41 will be able to locate in the stem 154 for delivering fuel directly into the cylinder 20, and the end region of the injector and fuel in the end region will be heated.

A fuel line 180 is provided for delivery of fuel to the injectors 40 and the fuel line 180 passes through a heat exchanger 190 which has an inlet 192 and an outlet 194. Exhaust gasses for heating the fuel line 180 within the heat exchanger 190 may be provided into the inlet 192 and exit the outlet 194. Alternatively, hot water from the cooling system or oil of the engine can pass through the inlet 192 to and exit the outlet 194 providing the heat exchange to the fuel passing through the fuel line 180. In still further embodiments electrical heating of the fuel line 180 may take place within the heat exchanger 190.

The heating of fuel passing through the fuel line 180 performs primary heating of the fuel so that when the fuel is delivered through the injector 40 it is warmed and will therefore evaporate more easily when it is deposited on the hot piston 24 within the engine. The primary heating of the fuel by the heat exchanger 190 can be useful if the wall 150 does not conduct sufficient heat to the end region 43 to raise the temperature to the temperature required for flash off or immediate vaporisation of the fuel as the fuel leaves the injector 40. The reason for this may be that the wall may be maintained too cool because of cooling liquid circulating through the engine or the like to raise the temperature of the fuel in the end region 43 sufficiently to create the flash off effect. The pre-warming of the fuel in the heat exchanger 190 can raise the fuel slightly before application to the injector 40, so that the heat conducted from the wall 150 will be sufficient to produce the flash off effect without overheating of the fuel which passes through the injector 40 which would otherwise damage the injector 40.

The injector 40 preferably has all its seals and coverings removed and which are replaced by single seal for sealing the injector 40 in the sleeve 154. It should be noted that there is not pressure on the injector 40 after the piston has risen on the compression stroke because the piston will pass the hole 152 as it compresses the fuel and gasses within the cylinder 20. As shown in FIG. 9, the hole 152 and sleeve 154 are angled downwardly to stop oil collecting in the stem 156.

As noted above, the injector 40 is fired to deliver fuel on top of the piston 24 to take advantage of the high operating temperatures of the piston 24 to act as a vaporiser when the fuel strikes it. The heat exchanger 190 preferably heats the fuel to a temperature of about 50° C. to 80° C. before delivery to the injector 40.

Figure 11:
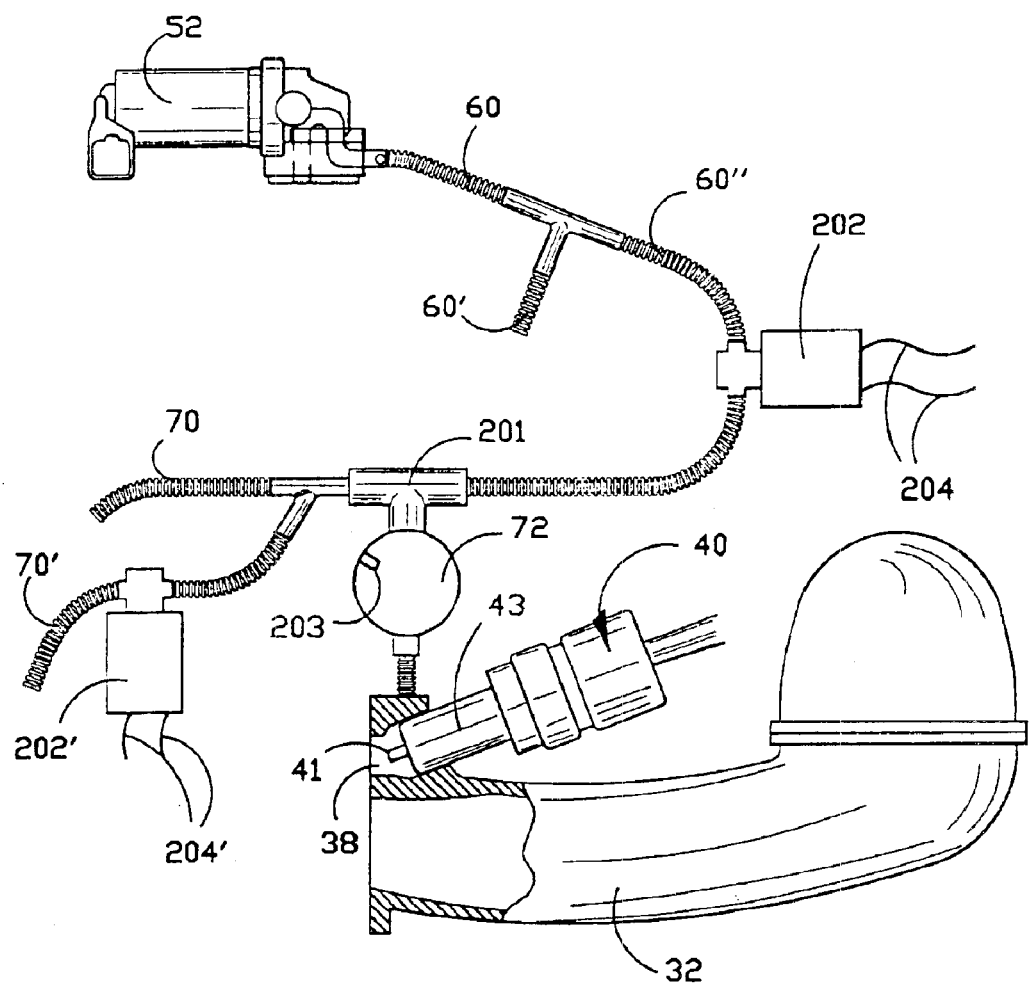
FIG. 11 is a view of a further embodiment of the invention.

FIG. 11 shows a further embodiment of the invention in which like reference numerals indicate like parts to those previously described.

Figure 11A:
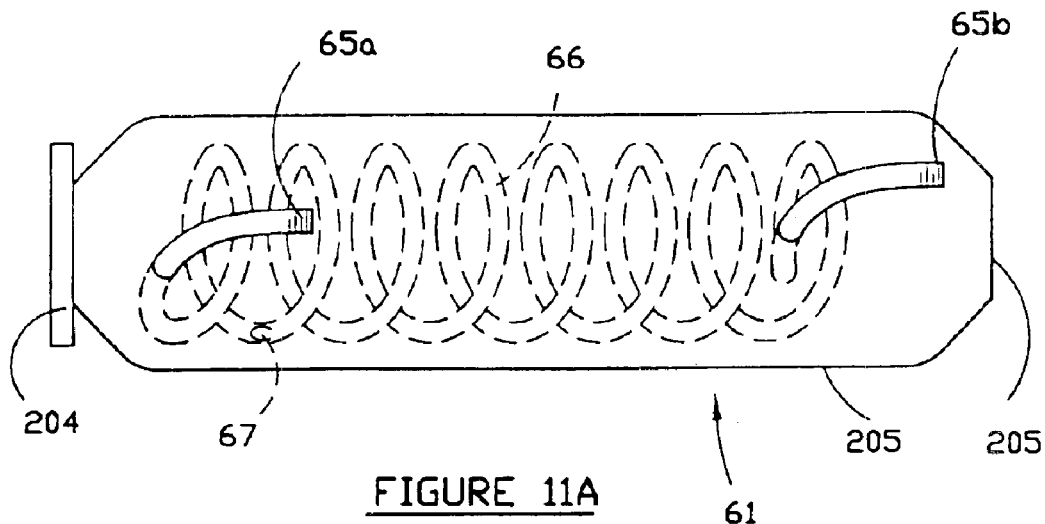
FIG. 11A is a view of a heat exchanger used in the embodiment of FIG. 11.

Idle solenoid 52 supplied air to idle air tube 60, as in the embodiment of FIGS. 1 and 2. However, in this embodiment the idle tube 60 is provided with a T piece 200 so that air can be directed into branch 60' and also into branch 60". Branch 60' is connected to heat exchanger 61, a modified form of which is shown in FIG. 11a. Heated idle air and some of the exhaust gas from the heat exchanger 61 is received into hot air tube 70, as in the earlier embodiment, and delivered to T piece 201. The T piece 201 couples to distributor tube 72 and also receives idle air from branch 60". Branch 60" is provided with a solenoid valve 202 which is opened and closed dependent on the temperature detected in the distributor by temperature sensor 203. The sensor 203 may simply output a signal to the solenoid 202 on conductors 204 so as to which the solenoid on when the temperature sensed by the sensor 203 exceeds a predetermined level, or may be coupled to a management system or computer which in turn supplies the signal to the solenoid 202 to activate the solenoid. When the solenoid 202 is activated idle air is able to pass through branch 60" to the T piece 201 and then into distributor 72. When the solenoid 202 is closed, no idle air is able to pass through the branch 60" to the T piece 201 and distributor 72. The distributor 72 communicates with bore 38 as previously described so that the hot exhaust gas and air mixture received from hot air tube 70 flows over end region 43 of the injector 40 so as to heat the fuel in the end region 43 before the fuel is ejected from the tip 41 of the injector 40. Thus, as is previously explained, when the fuel leaves the tip 41, the fuel immediately becomes vapour so that the vapour is conveyed in the hot air and exhaust gas flow from the bore 38 to the cylinder 20 for mixture with intake air which is drawn into the inlet manifold 32.

During normal operation of the engine, the temperature of the exhaust gas and air mixture entering the distributor 72 from hot air tube 70 may rise well above the temperature required to heat the end region 43 to the required temperature to ensure flash off when fuel is ejected from the injector 43. Depending on the heat of the day and engine operating conditions, the temperature of the hot air and exhaust gas mixture may be as high as 220–240°. By the time the hot gas has entered the distributor 72, the temperature of the gas may have reduced to a temperature of 160–175°, which is hotter than is required to bring the end region 43 to the required temperature to cause flash off. The increased temperature may well vaporise fuel in the end region 43, thereby causing the injector 40 to malfunction or incorrectly operate. If the sensor 203 detects a temperature in the distributor 72 above a predetermined value, such as 150°, the solenoid 202 is opened so that cool idle air is able to pass through the branch 60" to the distributor 72 to cool the air mixture in the distributor 72 back down towards the temperature of 150°. This temperature is sufficiently hot enough to heat the end region 43 so the fuel is raised to a temperature in the region 43, which will maintain the fuel in liquid state, but cause flash off into a vapour state upon ejection from the injector 40. If the temperature drops below 150°, the solenoid 202 is shut off to prevent cooling air from passing to the distributor 72 from the branch 60", thereby maintaining the temperature in the distributor 72 at a temperature of about 150° by selectively switching on and off the solenoid 202.

The switching on of the solenoid 202 to open the branch line 60" has the duel effect of reducing the amount of air passing into branch 60', thereby reducing the hot air which is received through the hot air line 70, and also providing the cooling effect by the direct application of cool air through the branch line 60" to the distributor 72.

In this embodiment a second exhaust gas line 70' is provided which communicates with the exhaust system of the vehicle. The line 70' may simply couple to a suitable part of the exhaust system so the exhaust gas can enter the line 70'. The line 70' is controlled by a second solenoid valve 202' which is activated via signals supplied on lines 204'. The solenoid 202' is activated when the pressure drops in the vacuum system of the engine when the accelerator pedal is pressed hard indicative of high speed requirement increased load. The second valve 202 is opened to enable exhaust gas from the line 70' to enter the T piece 201 and therefore be supplied with the gas in the line 70 to the bore 38. The introduction of the additional exhaust gas during high load or high speed requirements will further facilitate the reduction of NOx gas in the exhaust output.

The solenoid 202' can be operated by a pressure switch which, when the pressure does drop, outputs the current on lines 204' to activate the valve 202'. Alternatively, the valve 202' could be activated from the engine control unit. The second solenoid 202' generally remains closed during idle or low load and low engine speed because the additional exhaust gas is not required in those operating conditions.

Figure 11B:
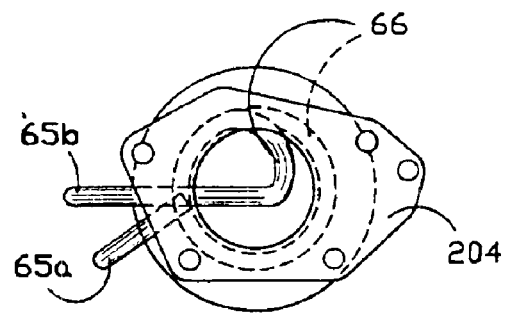
FIG. 11B is a view of the heat exchanger from one end.
Figure 11C:
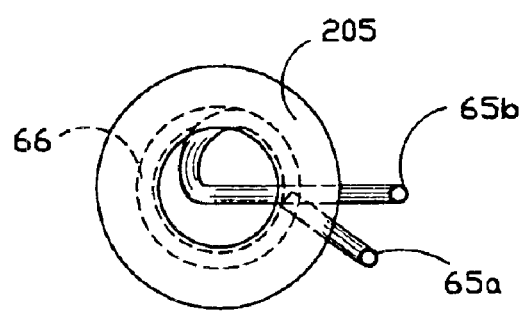
FIG. 11C is a view of the heat exchanger of FIG. 11a from the other end.

FIGS. 11a, 11b and 11c show a modified form of heat exchanger 61 to that described with reference to FIG. 1. In this embodiment, the heat exchanger is somewhat shorter and comprises a pipe 205 in which tube 66, which joins with tube 60" at end 65a is wound. The tube 66 exits the heat exchanger and end 65b is connected to tube 70 as in the earlier embodiment. The pipe 61 is provided with a flange 204 which can bolt onto the exhaust pipe of the engine, as previously described. End 205a is intended to be welded to the outlet manifold 12 (not shown) of the engine. This arrangement simply provides a shorter heat exchanger than in the earlier embodiment, but the heat exchanger performs the same function as described with reference to FIGS. 1 and 2. As described with reference to FIGS. 1 and 2, the tube 66 includes a hole 67 into which exhaust gas can flow so that the mixture of air and exhaust gas is provided to hot air tube 70 for delivery to the distributor 72.

Figure 12:
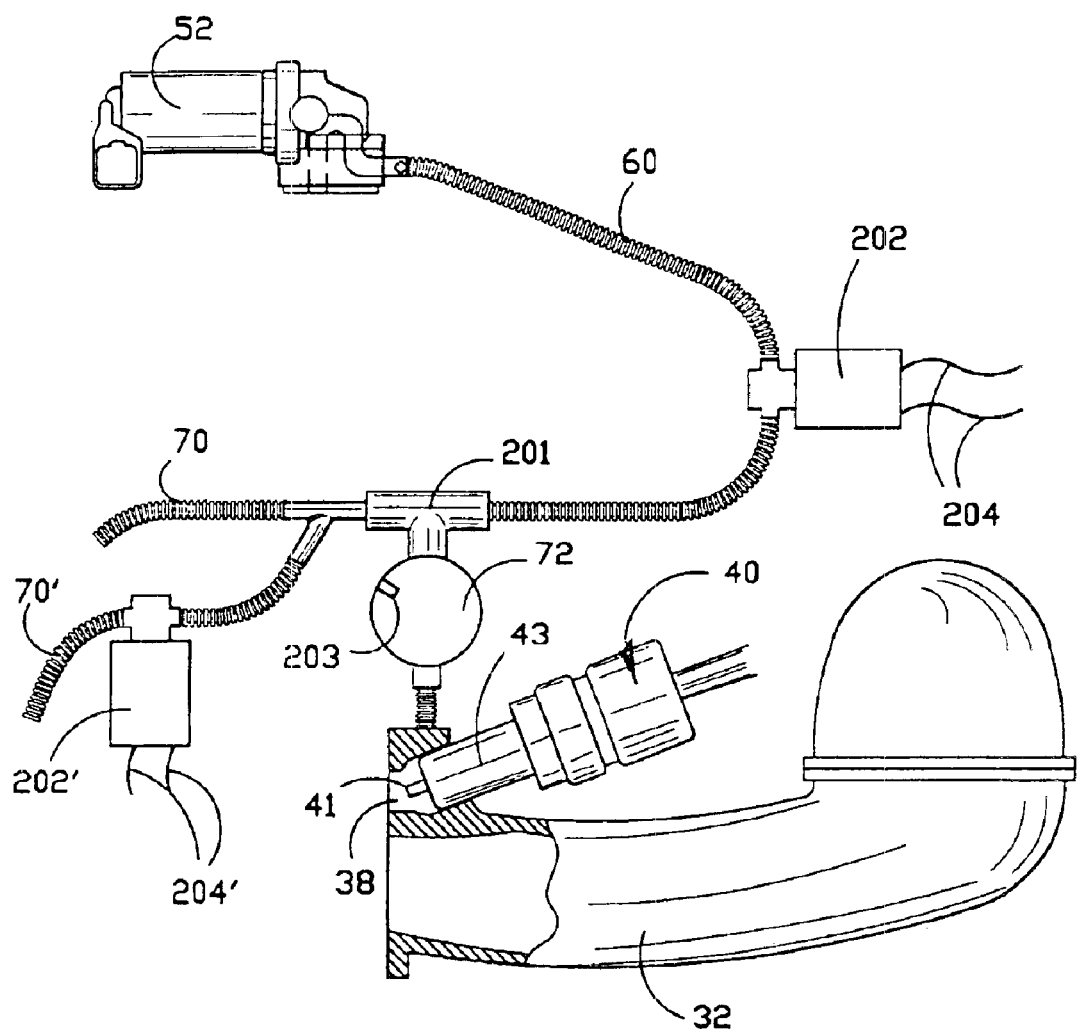
FIG. 12 is a view of a still further embodiment of the invention.
Figure 12A:
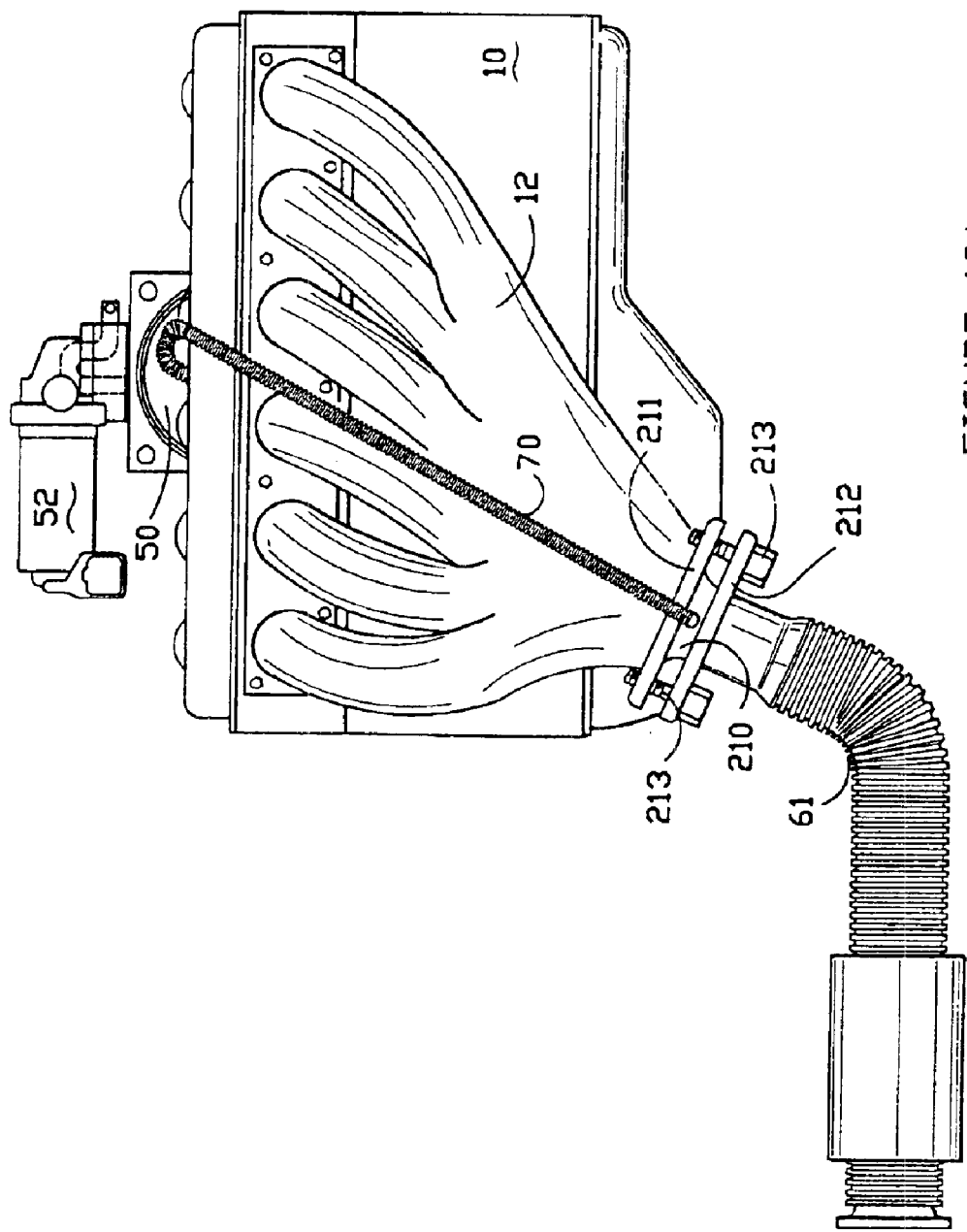
FIG. 12A shows part of the embodiment of FIG. 12.

FIG. 12 shows a modification to the embodiment of FIG. 11. In FIG. 12, the idle air tube 60 connects to T piece 201 for the supply of idle air. Solenoid 202 controls the flow of idle air through the tube 60 in the manner described with reference to FIG. 11, dependent on the temperature sensed by the temperature sensor 203. Exhaust gas, without any mixture of idle air, is received by the T piece 201 from hot air tube 70 for delivery into the distributor 72 and then to the end 43 of the injector 40 to heat the end 43 for the purposes previously described. FIG. 12A shows the tube 70 communicating with a cone 210 which is provided between flanges 211 and 212. The flanges 211 and 212 are joined by bolts 213 so that the cone 210 is sandwiched and sealed between the flanges 211 and 211 for communication with the exhaust manifold 12 and exhaust pipe 61.

Figure 12B:
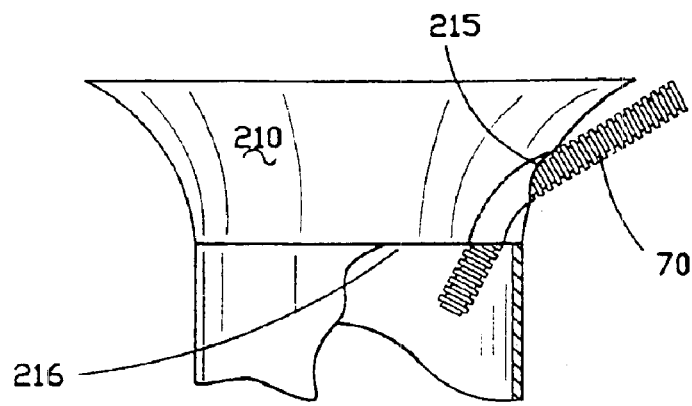
FIG. 12B is a side view of one of the components in FIG. 12A.
Figure 12C:
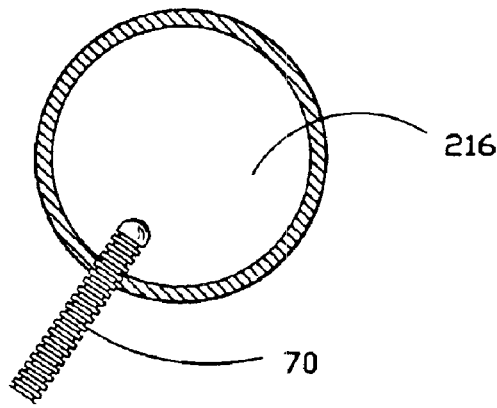
FIG. 12C is a bottom view of the component of FIG. 12A.

As is best shown in FIGS. 12A, 12B and 12C, the cone 210 receives the tube 70 which projects into a peripheral wall 215 of the cone 210 and then down through bottom opening 216 of the cone 210 simply to project into the exhaust pipe 61. Thus, when suction is applied to the tube 70, hot exhaust gas is drawn into the tube 70 for delivery to the T piece 201. Thus, in this embodiment of the invention, exhaust gas only is delivered along the hot air tube 70 for heating the end region 43 for the purpose previously explained. Should the temperature in the distributor 72 rise above the temperature referred to above, the solenoid 202 is activated so that idle air is able to pass through the idle air tube 60 into the distributor 72 to cool the gas flow to the end region as explained with reference to FIG. 11.

Figure 12D:
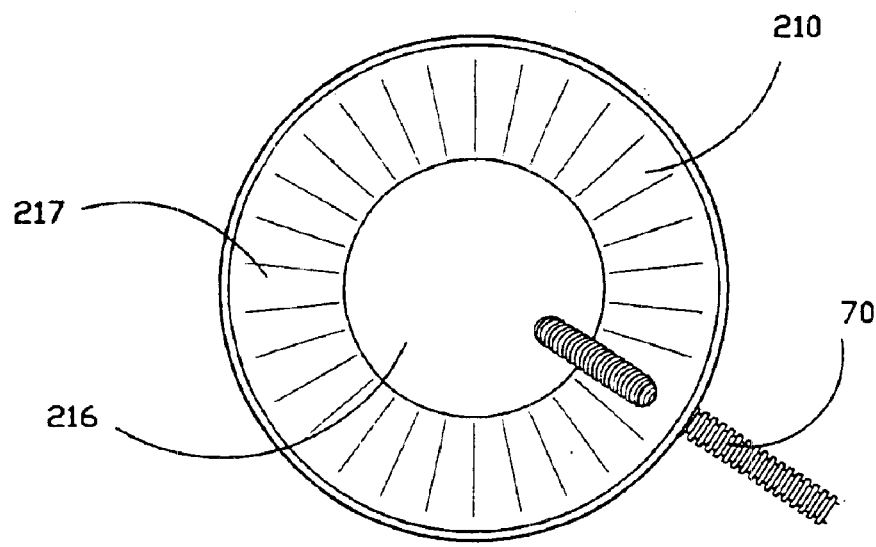
FIG. 12D is a top view of the component of FIG. 12A.

The embodiment of FIG. 12 also includes the additional solenoid 202' and line 70' which function in the same manner as the corresponding parts described with reference to FIG. 11. In this embodiment, exhaust gas only is supplied from the line 70' and the line 70' can couple to the line 70 at the vicinity where the line 70 joins the exhaust system, as will be described in more detail with reference to FIGS. 12B to 12D, to provide the additional exhaust flow during change in speed or high load.

It should be understood that since idle air does not mix with the exhaust gas supplied through the hot air tube 70 in this embodiment, the inlet manifold is provided with a conventional idle air passage for supply of idle air when the solenoid valve 202 is shut off to prevent air flow through the idle air tube 60.

Figure 13:
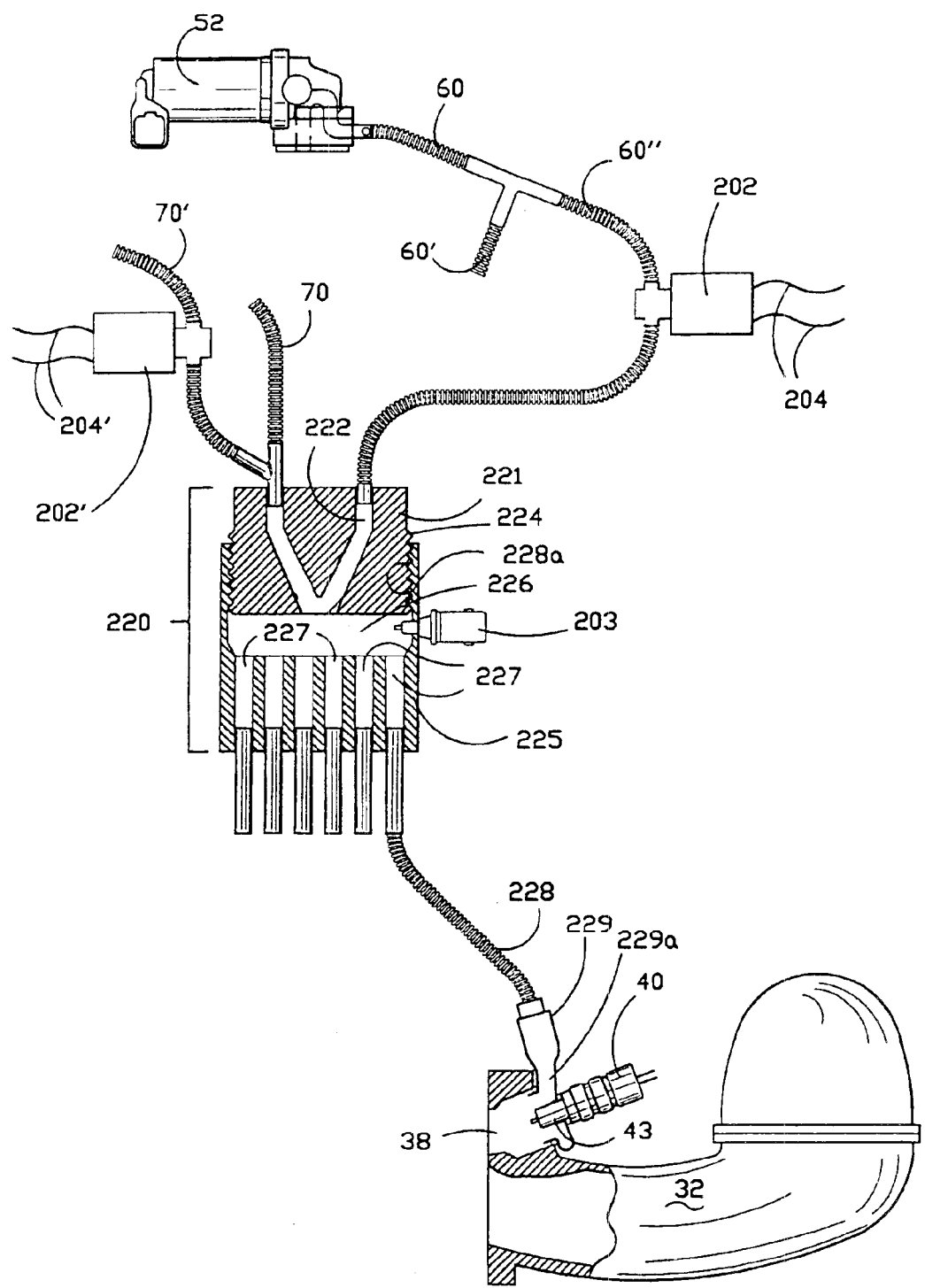
FIG. 13 is a view of a still further embodiment of the invention.

FIG. 13 shows an embodiment which operates on the same principle as FIG. 11, except that the distributor tube 72 is replaced by a distributor block section 220. Like reference numerals indicate like parts to those described with reference to FIG. 11, and this embodiment operates in the same manner as described with reference to FIG. 11.

In this embodiment, the hot air tube 70 and the branch 60" are received in a block 221, which includes a pair of bores 222 which receive the tube 70 and branch 60" respectively and which communicate with one another at end 223. The block 221 is provided with an external screw thread 224. A block 225 is provided with a hollow 226 which has an internal screw thread 228a for screwing onto the screw thread 224 to couple the blocks 221 and 225 together. The internal hollow 226 communicates with a plurality of separate conduits 227, one for each of the cylinders in the engine with which the system is to be used. Each of the conduits 227 has a hot air and fuel delivery tube 228 which extends to coupling pipe 229. It should be noted that only one of the tubes 228 and one coupling pipe 229 (together with one fuel injector 40) is shown in FIG. 13. The coupling pipe 229 is simply a small length of pipe having end 229 swaged down to a reduced diameter. Thus, the hot exhaust gas and air mixture is delivered to the end 43 of the injector 40 which mounts in the bore 38 in the same manner as previously described.

In this embodiment, temperature sensor 203 is provided in the peripheral wall of the block 225 for sensing the temperature of the hot air and exhaust gas mixture in the hollow 226.

Figure 14:
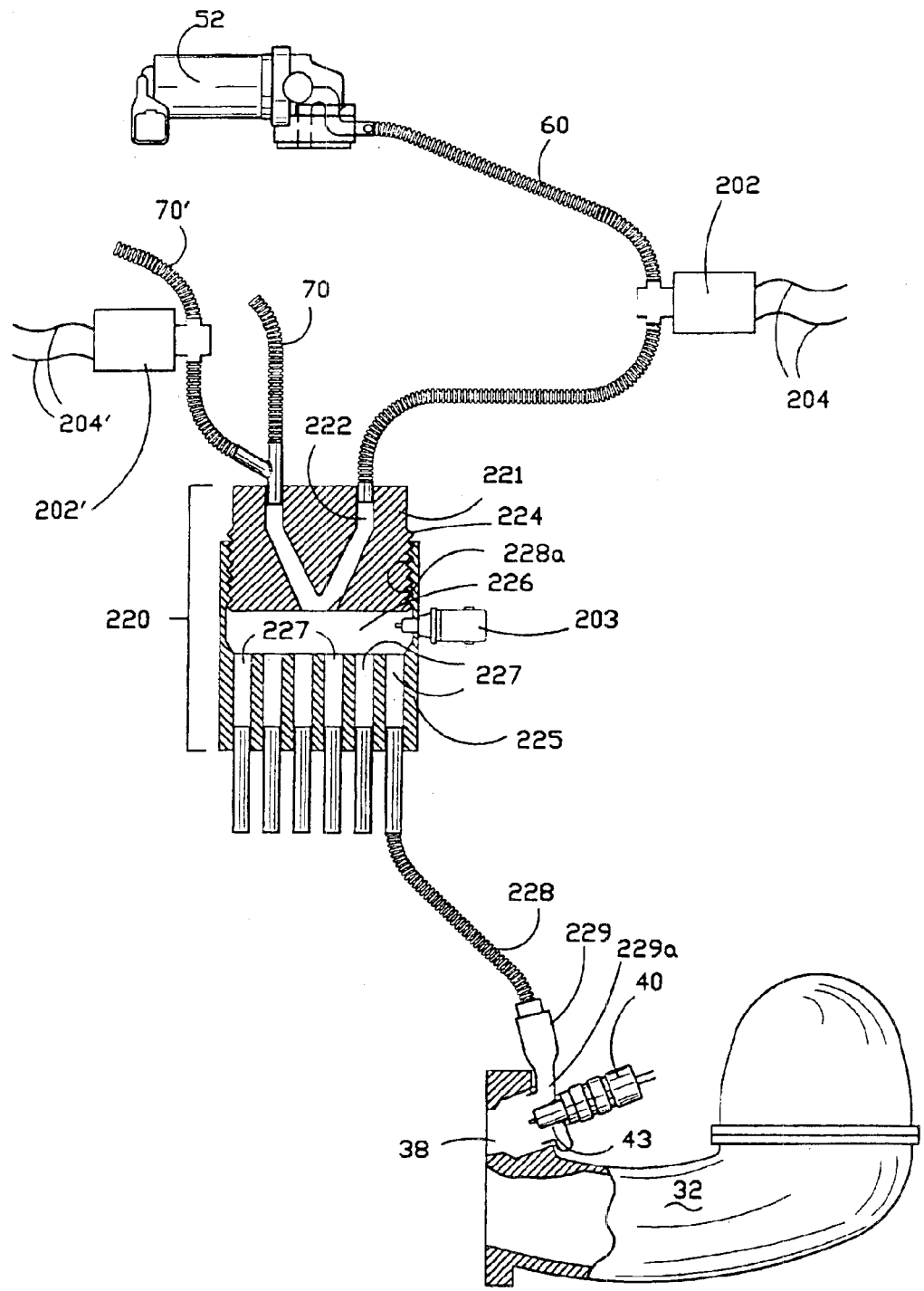
FIG. 14 is a view of a still further embodiment of the invention.

FIG. 14 shows an embodiment using the distributor mechanism of FIG. 13, but applied to the embodiment of FIG. 12 in which the exhaust gas only is delivered to the tube 70. This embodiment therefore works in the manner described with reference to FIG. 12, except that the distributor section 220 is configured in the manner described with reference to FIG. 13.

The embodiments of FIGS. 13 and 14 also include the additional solenoid 202' which operates in the same manner as described with reference to FIGS. 11 and 12 respectively.

Figure 15:
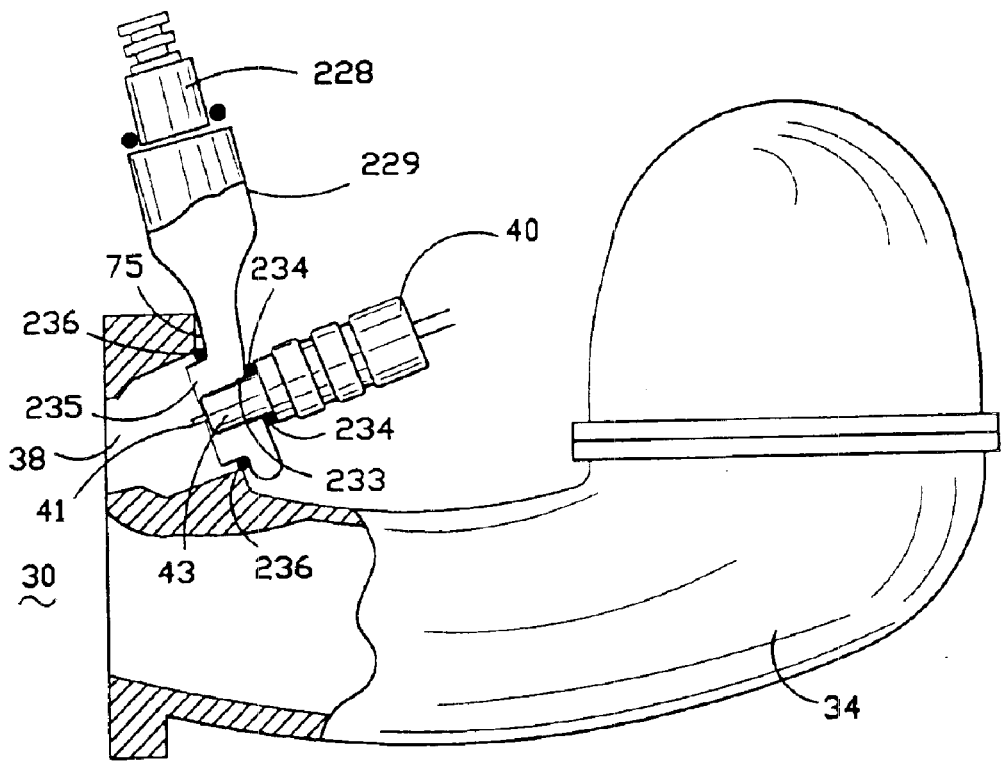
FIG. 15 is a view of a still further embodiment of the invention.

FIG. 15 shows the assembly of the injector 40 and the pipe 229 in more detail.

It can be clearly seen in this figure that the reduced diameter end 229a of the pipe 229 directs the hot air and exhaust gas mixture over the end 43 for heating the fuel in the end 43 for the purpose previously described. The vaporised fuel which will pass from the tip 41 into the bore 38 enters the inlet port 30 of the engine and no additional tubing or passageway is provided for conveying the hot air and gas mixture and vaporised fuel to the cylinder of the engine. As is apparent from FIG. 15, the reduced diameter end 229a of the pipe 229 is provided with a hole 233 into which end 43 of the injector 40 projects. The end 43 is sealed in the hole 223 by O-ring seal 234. The reduced diameter portion 229 has an opening 235 opposite the opening 233 and the opening 235 is sealed to the bore 38 by a O-ring seal 236. Thus, the end of the tube 229a forms a sealed region which envelopes the end 43 of the injector 40 so that hot air and gas mixture can impinge on and circulate around the end 43 for heating the end 43 in the manner previously described. The tip 41 is exposed to the bore 38 through the opening 235 for delivery of fuel vapour and also the hot air and exhaust gas mixture from the tube 229 to the bore 38 and then to the cylinder of the engine.

Figure 16:
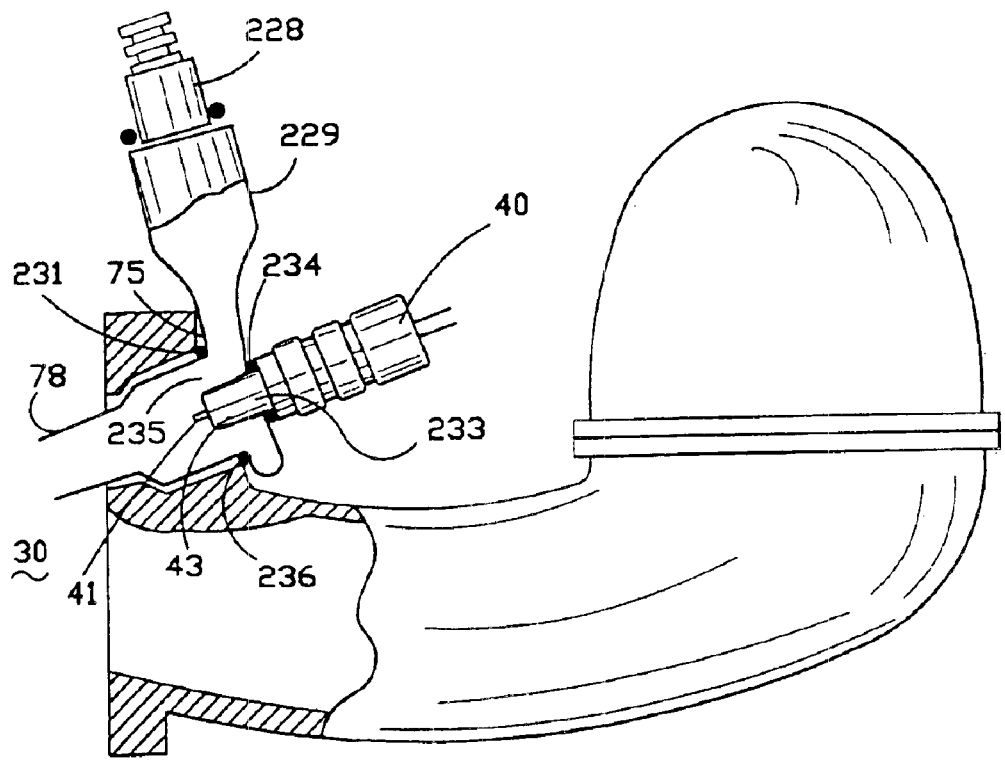
FIG. 16 is a view of a modified form of the embodiment of FIG. 15.

FIG. 16 shows a modification to the embodiment of FIG. 15 in which the reduced diameter end 229a of the pipe 229 is provided with an integral vapour tube 78 which effectively attaches onto the opening 235. The tube 78 functions in the manner of the tube 78 described with reference to FIG. 1 and may extend all of the way to the inlet valve 34 as shown in FIG. 2, or merely part of the way along the inlet port 30 of the engine. The tube 78 may be provided with a swirler 79 as in the earlier embodiment.

FIGS. 17 to 23 show still further embodiments of the invention.

Figure 17:
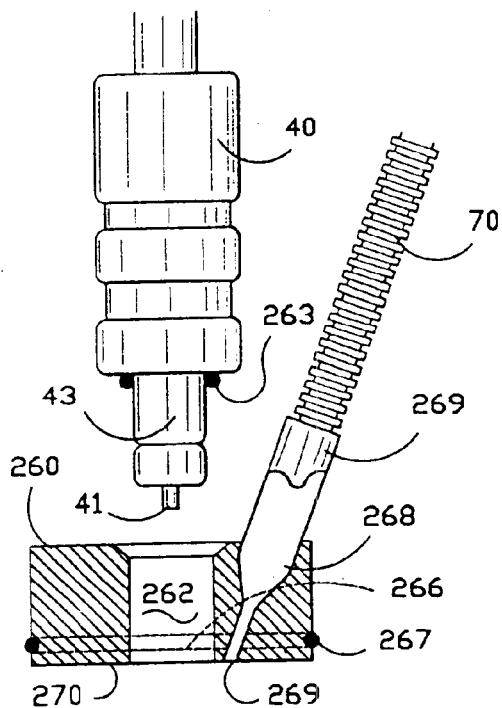
FIG. 17 is a view of a still further embodiment.
Figure 17A:
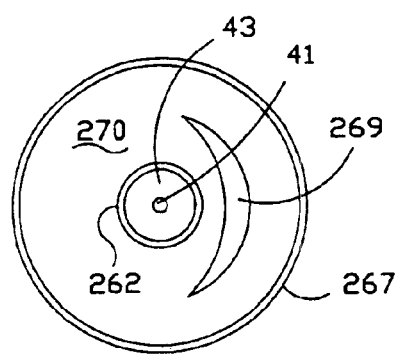
FIG. 17A is a bottom view of the embodiment of FIG. 17.

FIG. 17 shows a heat transmitting ring 260 which has a central bore 262 for receiving end region 43 of injector 40. As can be seen from FIG. 18, the end region 43 locates in the bore 262 and the end region 43 is sealed by an O ring seal 263. The ring 262 has a groove 266 for receiving O ring seal 267 which will seal the ring 260 as will be described with reference to FIG. 21. The ring 260 is provided with a bore 268 which receives pipe 269 for delivery of exhaust gas or hot air from line 70 out through opening 269 formed in the bottom surface 270 of the ring 260. The opening 269 may be crescent-shaped as in FIG. 17a, or simply a circular opening as in FIG. 18a. In this embodiment, the ring 260 is heated by contact with a hot portion of the engine, such as the inlet manifold and additional heat, depending on the nature of the ring 260 and the material from which it is formed, can be supplied via the introduction of hot exhaust gas or hot air from the hot air tube 70. Again, the heating of the ring 260 raises the temperature of the end region 43 to that required to heat the fuel in the end region so that when the fuel is ejected, it immediately flashes into the vapour state as previously described.

The exhaust gas is supplied to the hot air tube 70 in the same manner as described in the earlier embodiment. If it is desired to use hot air, hot air can be collected from a heated region of the engine, such as adjacent the radiator of the engine for supply to the ring 260 to facilitate heating of the ring 260.

Figure 21:
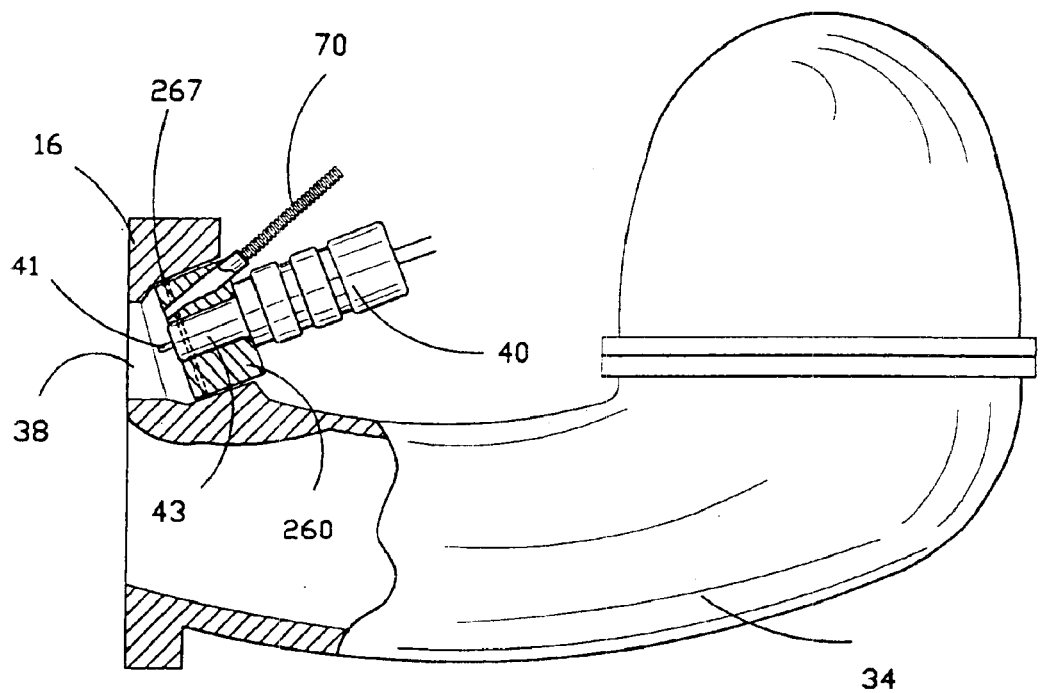
FIG. 21 shows the embodiment of FIG. 17 installed in an engine.

As is shown in FIG. 21, the ring 260 locates in inlet manifold 32 in bore 38 and can dispose heat to the inlet manifold inlet port to maintain the aluminium ring 260 and the desired temperature of between 80° C. and 150° C.

Figure 18:
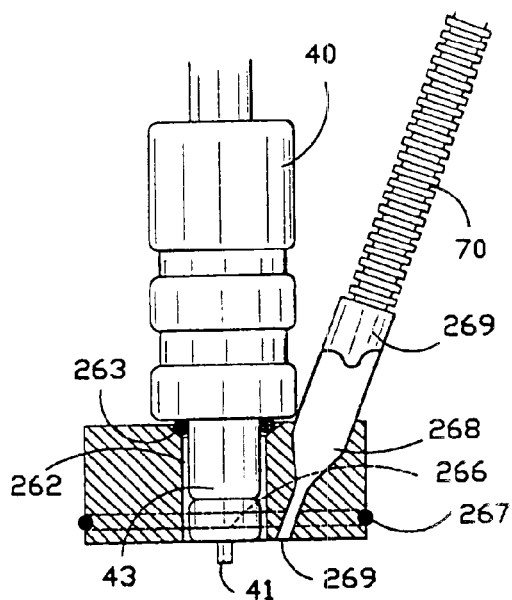
FIG. 18 is a view of the embodiment of FIG. 17 in the assembled condition.
Figure 18A:
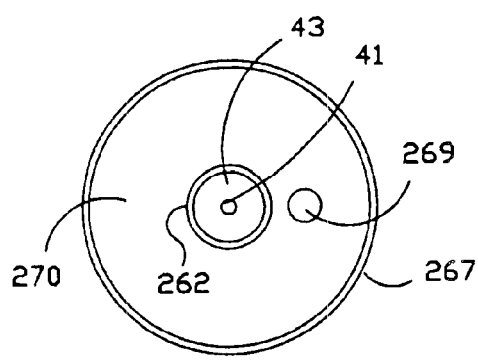
FIG. 18A is a bottom view of FIG. 18.
Figure 19:
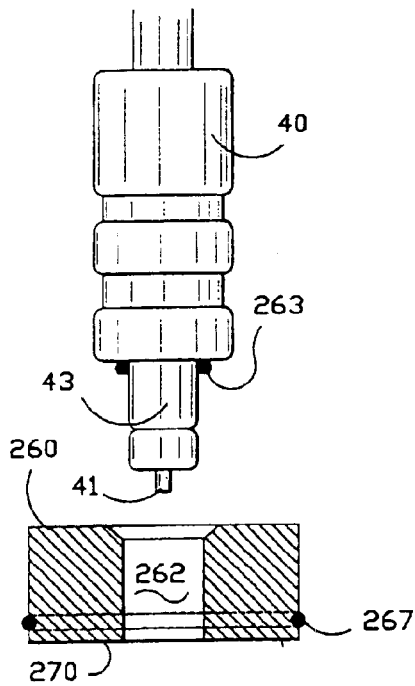
FIG. 19 is a view of a modified form of the embodiment of FIG. 17.
Figure 20:
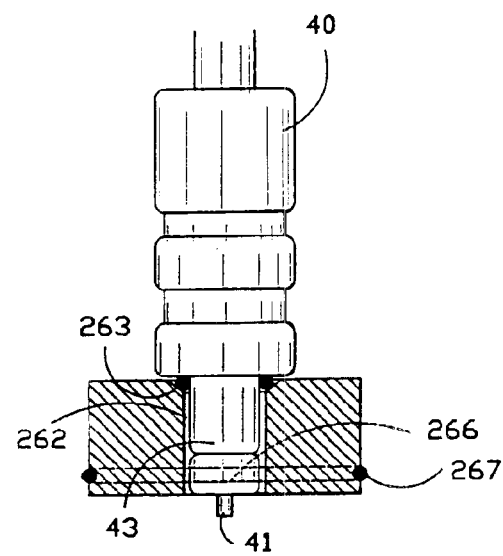
FIG. 20 is an assembled view of the embodiment of FIG. 19.
Figure 19A:
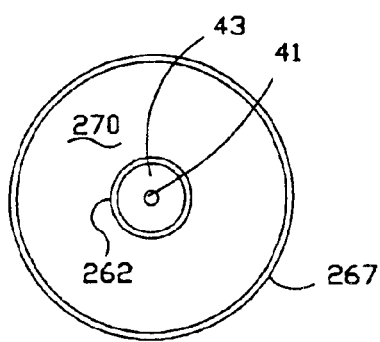
FIG. 19A is a bottom view of the embodiment of FIG. 19.
Figure 20A:
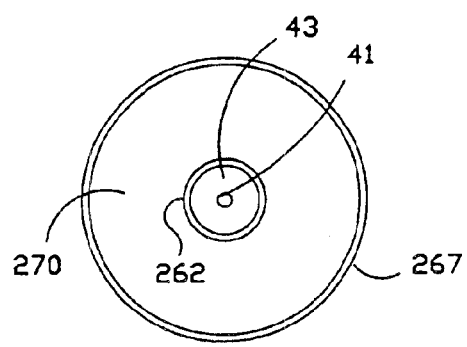
FIG. 20A is a bottom view of the embodiment of FIG. 20.

FIGS. 19 and 20 show an arrangement similar to FIGS. 17 and 18, but where heating of the end region 43 and the maintenance of vapour ejected from the tip 41 relies purely on heat conducted from the engine and the contact between the ring 260 and the engine. In this embodiment, the ring 260 may be formed from a material such as stainless steel which will heat up and maintain its heat for a significant period of time, thereby not requiring additional heating via hot air line 70. Thus, in this embodiment the required heat to raise the temperature of the end region 43 is supplied by direct conduction of heat from a heated component of the engine to the ring 260 and then to the end region 43 of the injector 40. The temperature of the normal combustion air change can be increased to maintain the vapour state of the fuel by taking the air from behind the radiator. The heating of the normal combustion air which enters the inlet manifold can provide a warm environment for the vapour as soon as the vapour leaves the injector 40 so that the vapour is maintained in the vapour state for the short distance of travel from the injector 40 until it disperses into the air flow. This therefore prevents condensing of the vapour and the return of the vapour to a liquid state.

Figure 22:
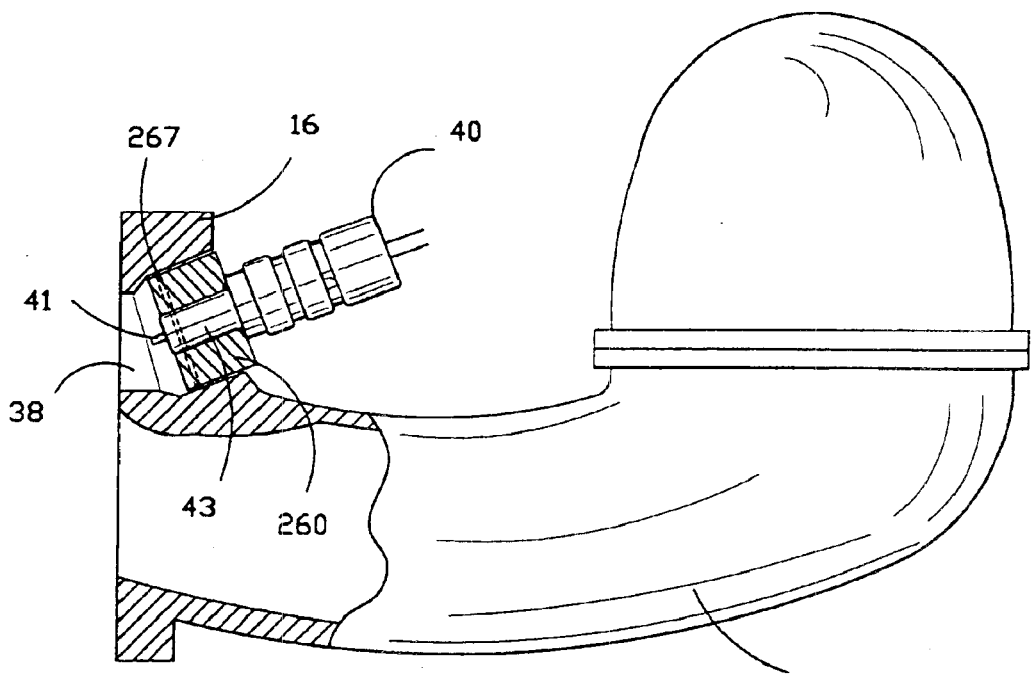
FIG. 22 shows a view of the embodiment of FIG. 19 installed in an engine.
Figure 23:
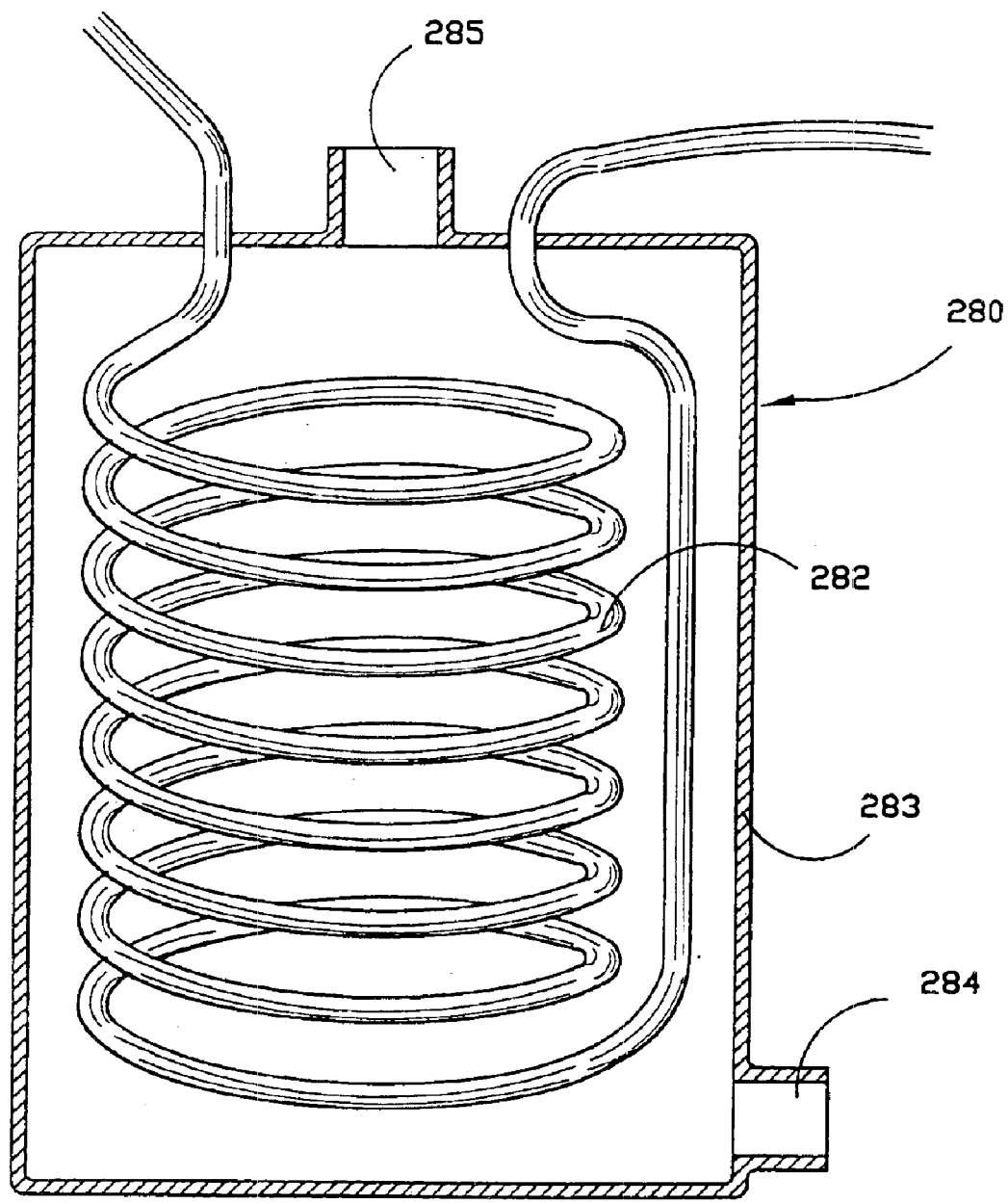
FIG. 23 shows a fuel heat exchanger which may be used with the embodiment of FIG. 22.

FIG. 22 illustrates the ring 260 of FIGS. 19 and 20 located in the enlarged bore 38 in a similar fashion to that shown in FIG. 21.

It will be apparent from FIGS. 21 and 22 that the ring 260 is sealed in the enlarged bore 38 by the O-ring seal 267.

In the embodiment of FIG. 22, because there is no additional supply of hot air exhaust gas to the ring 260, which will further facilitate heating of the ring 260, to in turn heat the end portion 43 of the injector 40, and to direct hot air and gas mixture into the bore 38 for mixture with the vaporised fuel ejected from the tip 41, the fuel supplied to the injector 40 may desirably be warmed before it is supplied to the injector 40. In order to warm the fuel, the fuel prior to delivery to the injector 40 can pass through heat exchanger 280 shown in FIG. 23, which includes a fuel line 282 emersed in container 283 into which hot fluid passes via inlet 284 and exits via outlet 285. The fluid may be hot water from the cooling system of the engine, oil or any other suitable fluid to provide heat exchange to the fuel line 82 and to warm the fuel before delivery to the injector 40. It should be understood that the degree of warming is not to completely heat the fuel to the vaporisation point previously described, but merely to provide some additional warming to facilitate the elevation in temperature of the fuel in the end region 43 to the required temperature so that when the fuel is ejected from the tip 41, the fuel vaporises immediately in the manner previously described.

Figure 24:
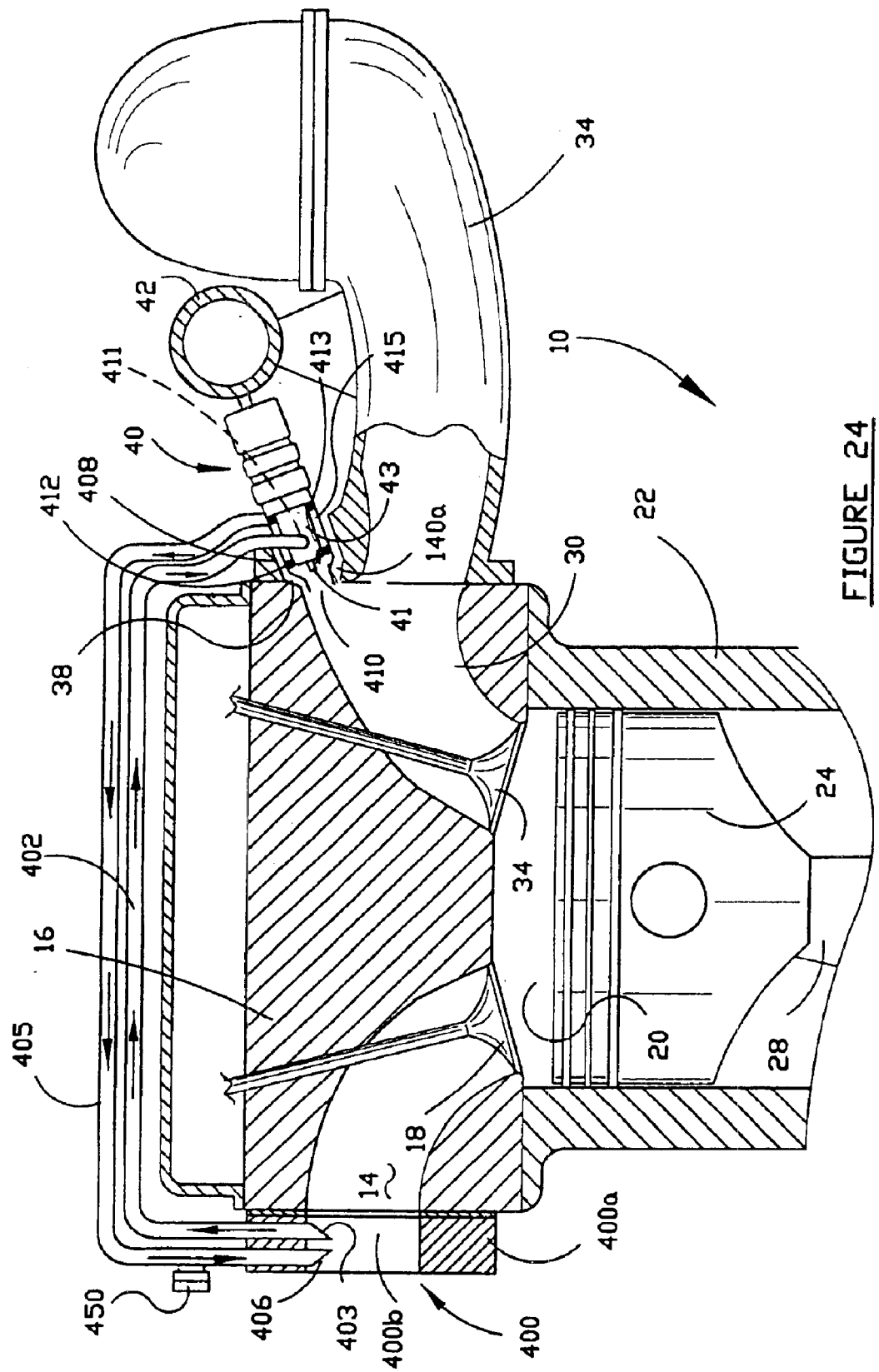
FIG. 24 is a view of a still further embodiment of the invention which is intended for retrofit to an engine.
Figure 25:
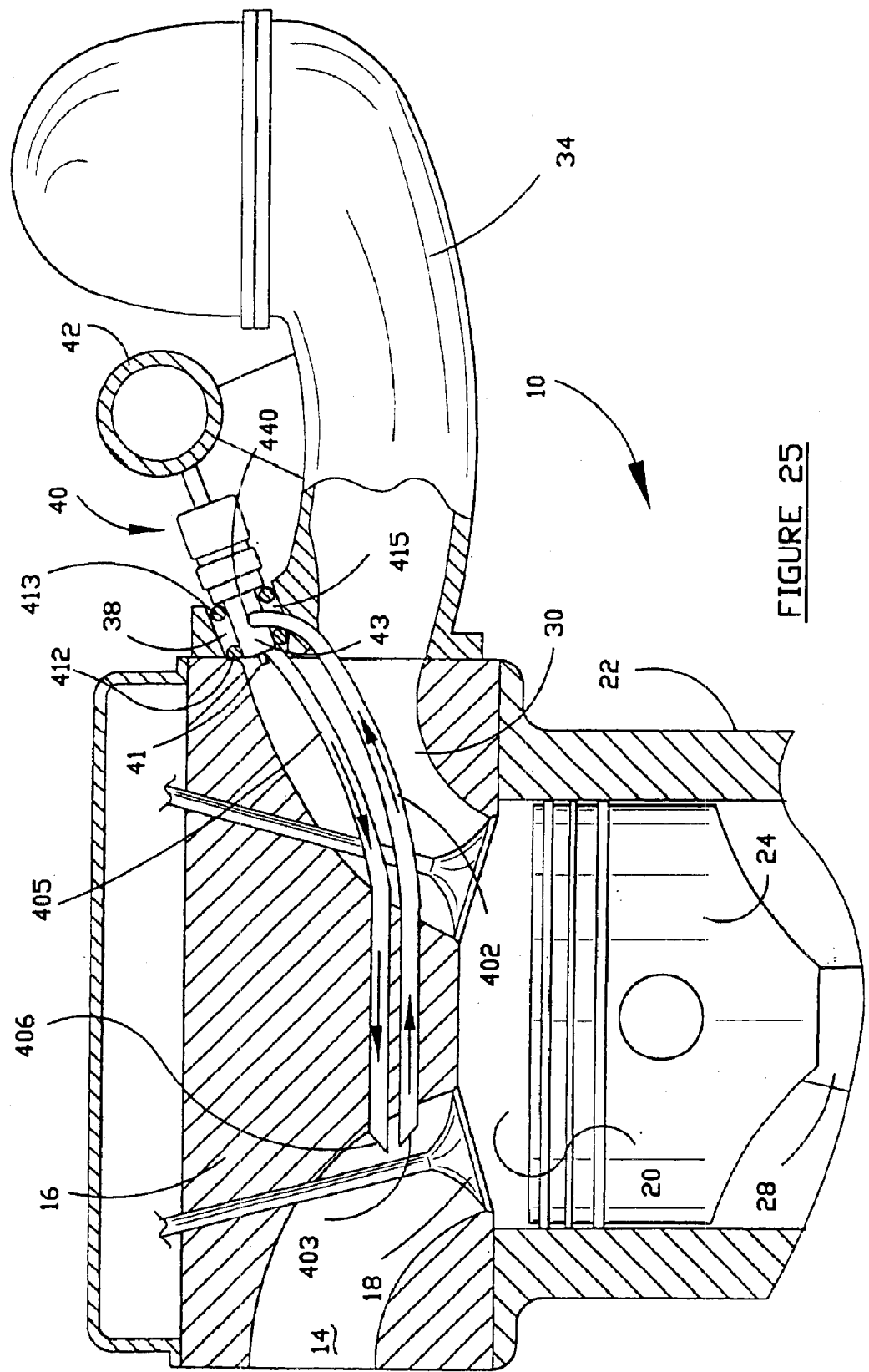
FIG. 25 is a view of a modified form of the embodiment of FIG. 24 intended for incorporation as original equipment in an engine.

FIGS. 24 and 25 show two further embodiments of the invention. As will be apparent from a consideration of the embodiments previously described, some of the exhaust gas which is used to heat the end of the injector is conveyed with the fuel vapour through the passage leading to the cylinder (ie. through the inlet port) so as to be drawn into the cylinder with the fuel vapour and combustion air. Supplying some of the exhaust gas to the cylinder in this manner does provide the advantage that it may well facilitate maintenance of the vapour which leaves the injector in a vapour state as the vapour travels from the injector to the cylinder, however, the supply of the exhaust gas also does present a disadvantage. The disadvantage is that the supply of the exhaust gas dilutes the incoming air charge so that the given volume of air on any intake stroke of the engine reduces by comparison to an engine not fitted with an exhaust gas recirculation system, and as a result, there is a loss of power as there is less air by density per volume to mix with the fuel, thus altering the air fuel ratio from its optimum for creating power and emissions. Whilst the exhaust gas has a positive effect on the $NO_x$ emission, there is an increase in total emissions in the exhaust gas from the vehicle. The preheating of the combustion air which is drawn into the engine, whether that be with exhaust gas or simply a preheating of the air before it is supplied to the cylinder, also provides a disadvantage in that the $NO_x$ emissions are increased. Furthermore, carbon monoxide emissions also increase.

The embodiments of FIGS. 24 and 25 provide the advantages of the embodiments previously described, but avoid the disadvantages which are discussed above.

Referring first to FIG. 24, in which like reference numerals indicate like parts to those previously described, a flange 400 is provided on the outlet port 14 of the engine to which an exhaust pipe (not shown) or outlet manifold (not shown) is attached for conveying exhaust gases to atmosphere. The flange 400 is in the form of a ring, as is conventional, having a peripheral annular wall 400a which defines a central opening 400b through which exhaust gas passes to the exhaust system of the vehicle. An exhaust gas supply tube 402 is connected to the flange 400 and projects through the wall 400a and into the opening 400b of the flange 400 into the path of exhaust port 14. The tube 402 has a chamfered end 403 which faces the port 14 so exhaust gases exiting the port 14 tend to flow into the tube 403. An exhaust gas return tube 405 is also connected with the flange 400 and protrudes into the flange 400 generally adjacent the tube 402 in the same manner as the tube 402. The tube 405 has a chamfered end 406 which faces away from the port 14, so that when exhaust gas leaves the port 14 and passes through the flange 400, a venturi effect is established at the end 406 so as to tend to draw exhaust gas out of the tube 405. The tubes 402 and 405 can be welded or otherwise secured to the flange 400 for permanent connection to the flange 400.

The tubes 402 and 405 connect to an injector housing 408. The housing 408 is generally a hollow cylinder which has a tapered end wall 409 which leads to an outlet opening 410. The tube 402 communicates with a hole 411 shown schematically in FIG. 24 which is provided in the periphery of the cylindrical housing 408. The tube 405 also communicates with a hole (not shown) in the periphery of the housing 408, and which is generally diametrically opposed to the hole 411. The injector 40 is the same as that previously described and has an end portion 43 which is received within the cylindrical housing 408. A first seal 412 seals the end 43 to the inner periphery of the cylindrical housing 408 adjacent the tapered wall 409, and a second seal 413 seals the end region 43 to the inner periphery of the cylindrical housing 408, remote from the opening 410. Thus, the seals 412 and 413 define a chamber 415 which extends about the end 43 and with which the tubes 402 and 405 communicate via the hole 411 and the corresponding hole with which the tube 405 communicates.

As is shown in FIG. 24, the cylindrical housing 408 is a pressed fit into the bore 38 which, in conventional engines, would accommodate the fuel injector, and is held in place by the injector 40 and its connection to the fuel rail 42. Thus, the cylindrical housing 408 is prevented from moving out of the bore 38. As is apparent from FIG. 24, the hole 411 which connects with the tube 402, and the corresponding hole in the housing 408 which connects with the tube 405 are located in part of the housing 408 which projects out of the bore 38 towards the fuel rail 42, thus not interfering with insertion of the housing 408 into the bore 38. The tubes 402 and 405 are permanently connected to the housing 408 by welding and therefore the system formed by the flange 400, the tubes 402 and 405, and the housing 408 form a single assembled unit which is adapted for retrofitting to an existing engine and into which the fuel injector 40 can be inserted as shown in FIG. 24.

When the engine is operating, exhaust gas flows through the tube 402 and into the chamber 415 to heat the end 43 of the injector 40 in the same manner as previously described. The exhaust gas is able to fill the chamber 415 and does not leave the chamber 415 passed the seal 412, so that no exhaust gas is supplied into the inlet port 30 of the engine. The exhaust gas exits the chamber 415 through the tube 405 and is supplied back to the flange 400 via the chamfered end 406 of the tube 405. Thus, the circulating exhaust gas heats the end 43 in the manner previously described, so that the temperature of the fuel within the end 403 is elevated, so that as soon as the fuel exits the tip 41, the fuel immediately flashes into a vapour state in the same manner as previously described. Thus, this embodiment provides all of the advantages of the vaporised fuel which exit the tip 41 and which are previously described, but avoids the supply of exhaust gas to the inlet port 30 and heating of the inlet air which is supplied through the inlet manifold 32 to the inlet port 30. Thus, emissions and engine efficiency are not detrimentally effected because the inlet air is not preheated and no exhaust gas is supplied to the inlet port 30. The fuel is maintained in a vapour state after leaving the injector tip 41 simply because it disperses into the intake air flow as previously described, and is therefore not able to basically recombine into a liquid state. Thus, the use of heated air, if emission issues were not of importance, whilst may be of some advantage, is not necessary in order to ensure that the fuel remains in a vapour state as it travels from the injector tip 41 to the cylinder 20.

FIG. 25 shows a modified form of the embodiment of FIG. 24 which is intended for original equipment installation rather than retrofitting of an existing engine. In this embodiment, inlet tube 402 is provided through the head 16 and passes through inlet port 30 to a drilled opening through the inlet manifold 33 and which is shown exemplary by reference 440, so as to communicate with the bore 38. The injector 40 is mounted directly in the bore 38, as is conventional, and seal 412 and seal 413 act to seal the end region 43 of the injector 40 within the bore 38 and define the chamber 415 previously described. The exhaust outlet tube 405 also communicates with a bore (not shown) through the inlet manifold 33 which communicates with the chamber 415, and which is diametrically opposite the bore 440. As is apparent from FIG. 25, the inlet tube 402 is provided with a chamfered end 403 which is arranged so that exhaust gas leaving the cylinder and entering the exhaust port 14 will tend to flow into the tube 402 and the tube 405 is provided with a chamfered end 406 which is directed away from the cylinder so that exhaust gas flow over the end 406 will create a venturi effect to suck exhaust gas through the tube 405. Thus, once again, exhaust gas is able to enter the chamber 415 and circulate about the exposed end region 43 of the injector 40 to heat the end region 43, as in the earlier embodiments, so as to increase the temperature and pressure of the fuel in the end region 43, so that when the fuel exits the tip 41, the fuel immediately flashes off into a vapour state.

As is apparent from the above description, the end regions 43 of the injectors 40 are the same as those in the previous embodiments, which are provided by removing the normal insulation from about the injector end region, exposing the metal end region 43 so that the metal is able to be heated by the exhaust gas to in turn heat the fuel within the end region 43 in the manner previously described.

The fuel in the end region is heated to a temperature in the range 88° C. to 220° C. by the hot circulating exhaust gas supplied to the chamber 415. The exhaust gas can and does reach a hotter temperature as per normal operating conditions of an engine, to ensure that the liquid fuel within the end region reaches its optimum temperature within the ranges previously mentioned. The exhaust gases heat the outer wall of the injector end region 43 and in turn heats the fuel as it passes through the end region 43. The volume and temperature of the exhaust gas supplied to the chamber 415 will be dependent on engine speed and engine load. That is, the faster or the greater the load on the engine, the hotter the exhaust gases and larger the exhaust gas volume. Whilst operating in those particular circumstances, an engine requires more fuel which in turn requires the greater amount of heat from the hotter exhaust gas to maintain the vapour creating temperatures in the end region 43. Thus, when the engine is operating at maximum speed, it may be necessary for the end region to be heated to temperatures in excess of say 220° C. in order to impart sufficient temperature to the fuel which is held in the end region only for a very short amount of time, in view of the high engine revolution speed, and therefore high delivery speed of fuel from the injector, to thereby ensure that the fuel does increase to the required temperature to flash into a vapour state immediately it leaves the injector. At much lower engine speed, for example at idle, the rate of delivery of fuel from the injector is obviously much less and therefore the fuel remains in the end region 43 for a greater time period, thereby enabling a lower temperature of the end region, such as 88° C. in order to heat the fuel in the end region to the required temperature. Thus, this embodiment products temperature fluctuations of the exhaust gas due to varying operating conditions of the engine, to perform the heating function in accordance with the volume of fuel which is required by the engine. Conversely, as the engine speed and loads are reduced, the exhaust gas temperature and volume reduces, as does the amount of fuel required by the engine, and this mean less heat must be supplied to the end region to heat the fuel to maintain the vapour creating effect previously described. The supply of exhaust gas to the chamber 415 can also be controlled by a valve member 450, which is in the form of a screw which can partially block the tube 405 (or the tube 402) to thereby reduce the flow of exhaust gas through the tubes 402 and 405. The exhaust gas, as is apparent from FIGS. 24 and 25, is preferably extracted from the exhaust system as near as possible to the engine exhaust valve.

It should be understood that in the embodiments of FIGS. 24 and 25 and in the earlier embodiments in which the end region of the 43 of the injector body is heated, the heating of the fuel at that region is downstream of the electronic componentry of the injector 40 and therefore the elevation in temperature of the fuel in the end region does not cause damage to the electronic component in the injector 40. Indeed, the fuel is delivered to the injector 40 at normal temperatures and facilitates cooling of the electronic components, notwithstanding the heating of the end region 43 of the injector.

Since modifications within the spirit and scope of the invention may readily be effected by persons skilled within the art, it is to be understood that this invention is not limited to the particular embodiment described by way of example hereinabove.

What is claimed is:

1. A fuel delivery system for an internal combustion engine having at least one cylinder and a piston arranged for movement in the cylinder, the system including; a fuel injector having a body which contains electronic componentry for operating the injector, and an end region from which fuel is delivered for delivering fuel to the cylinder, the end region having an outer surface;

means for heating the outer surface of the end region of the injector, but not the body, to thereby heat fuel inside the end region before the fuel undergoes controlled ejection from the injector, so that as soon as the fuel leaves the injector, the fuel substantially immediately converts to vapour state because of the heating of the fuel and the change in pressure experienced by the fuel when the fuel leaves the injector; and a fuel passage extending between the fuel injector and the cylinder for conveying the vapour from the injector to the cylinder so the vapour is maintained in a vapour state as the fuel travels along the fuel passage from the injector to the cylinder.

2. The fuel delivery system of claim 1 wherein the end region of the injector is heated by providing the end region of the injector as a heat conducting end region for conducting heat into the end region of the injector.

3. The fuel delivery system of claim 1 wherein the means for heating comprises a chamber surrounding the end region of the injector, an exhaust gas inlet communicating with the chamber, an exhaust gas supply line extending from an exhaust gas outlet of the engine to the exhaust gas inlet, an exhaust gas outlet communicating with the chamber, so that exhaust gas produced by the engine is able to enter the exhaust gas supply line to fill the chamber and thereby heat the end region of the injector, and then escape through the exhaust gas outlet.

4. The system of claim 3 wherein an exhaust gas delivery line extends from the exhaust gas outlet to the exhaust system of the vehicle.

5. The system according to claim 3 wherein the chamber is defined by an outer housing, a first seal through which end region of the injector extends, the first seal sealing the end region to the housing, a second seal remote from the first seal, the second seal sealing the end region to the housing.

6. The system according to claim 3 wherein the chamber is defined by a first seal which seals the end region of the injector to an injector bore in the engine, a second seal remote from the first seal for sealing the end region of the injector to the bore so that the chamber is defined between the first and second seal, the end region of the injector between the first seal and second seal and an inner peripheral wall of the bore.

7. The system according to claim 3 wherein the delivery line has a chamfered end directed so the exhaust gas exiting a cylinder of the invention is directed into the end of the supply line.

8. The system according to claim 4 wherein the return line has a chamfered end facing away from a cylinder of the engine so that when exhaust gas passes the end of the return line, a venturi effect is created for drawing exhaust gas through the exhaust gas supply line, the chamber and the exhaust gas delivery line.

9. The fuel delivery system of claim 1 wherein the means for heating the end region of the injector comprises exhaust gas deliver means for delivering exhaust gas created by combustion of fuel and air in the engine, to the end region of the injector for heating the end region of the injector.

10. The fuel delivery system of claim 9 wherein the exhaust gas delivery means directs the exhaust gas to the end region of the injector so that the exhaust gas impinges on the end region of the injector to heat the end region of the injector and the fuel in the end region of the injector.

11. The fuel delivery system of claim 1 wherein the means for heating the end region of the injector includes a heat conducting support element for supporting and contacting the end region of the injector and for contact with a heated portion of the engine so that heat is conducted from the engine, through the support member to the end region of the injector to heat the end region of the injector.

12. The fuel delivery system of claim 11 wherein the support member comprises a ring having a cylindrical outer wall for receipt in a bore in a heated component of the engine for heat transfer from the engine to the ring, and a cylindrical hole having an internal cylindrical wall for receiving the end region of the injector so that the end region is in contact with the inner cylindrical wall so heat is conducted from the heated component to the ring and then to the end region of the injector.

13. The fuel delivery system of claim 1 wherein the fuel delivery system includes a heat exchanger having a heat exchange tube for arrangement in an exhaust outlet of the engine, the heat exchanger tube having one end coupled to an air supply tube for delivering air from an air inlet, and the other end of the heat exchanger being coupled to a hot air return tube for delivering air heated in the heat exchanger tube to the end region of the injector and the passage extending between the fuel delivery element and the cylinder.

14. The fuel delivery system of claim 12 wherein the heated component of the engine is provided on the exhaust side of the engine in the vicinity of the exhaust manifold and an air inlet tube is provided for directing cool air to the end region of the injector so the end region of the injector does not overheat.

15. The fuel delivery system of claim 12 wherein the heated component is on the air inlet side of the engine.

16. The fuel delivery system of claim 15 wherein an inlet opening is provided for allowing exhaust gas to enter the hot air return tube so that exhaust gas and air pass through the hot air return tube and a mixture of air and exhaust gas is delivered to the end region of the injector and the passage.

17. The fuel delivery system of claim 16 wherein the inlet opening is provided in the heat exchanger tube adjacent where the heat exchanger tube joins the air supply tube.

18. The fuel delivery system of claim 17 wherein the air supply tube is coupled to an idle air supply for the engine so that idle air travels through the supply tube to the passage extending between the fuel delivery element and the cylinder and is heated by passage through the heat exchanger tube and by the mixture of exhaust gas which enters the inlet opening, the exhaust gas and air mixture being supplied with the air to the end region of the injector and the passage extending between the fuel delivery element and cylinder.

19. The fuel delivery system of claim 13 wherein the heat exchanger includes a pipe which couples between an exhaust manifold of the engine and an exhaust pipe which conveys exhaust gas to atmosphere.

20. The fuel delivery system of claim 1 wherein the passage between the fuel delivery element and cylinder comprises a fuel and air delivery tube provided in an air inlet port of the engine.

21. The fuel delivery system of claim 20 wherein a swirler is arranged within the fuel and air delivery tube for causing the mixture of air, exhaust gas and fuel vapour to swirl as it passes along the air and fuel delivery tube to thereby cause the air, exhaust gas and fuel vapour to mix.

22. The fuel delivery system of claim 13 wherein the engine includes a plurality of fuel injectors, the hot air return tube being coupled to a distributor tube, the distributor tube having a plurality of outlet tubes, one of the outlet tubes corresponding to each of the fuel injectors, each outlet tube extending at an angle substantially perpendicular with respect to the direction of fuel ejection from the respective injector.

23. The fuel delivery system of claim 13 wherein the passage for delivering fuel and air passes through the exhaust port and through the engine head to the air inlet port, the passage having an inlet opening in the exhaust port so exhaust gas is drawn into the passage for mixing with the air and fuel delivered from the passage to the cylinder.

24. The fuel delivery system of claim 23 wherein the air supply tube passes through a heat exchanger arranged on the exhaust outlet of the engine for primary heating of the air which is then delivered about the fuel injector.

25. The fuel delivery system of claim 1 wherein the passage is arranged within the air inlet manifold, the passage having an air inlet branch extending into the air inlet and an exhaust gas delivery branch communicating with the exhaust port of the engine, an exhaust gas delivery tube extending between the exhaust gas inlet and the air delivery branch and extending through the passage, so that when fuel is injected into the passage from the fuel injector the fuel mixes with air entering the inlet branch and travels along the passage about the exhaust gas delivery tube so that heat exchange takes place to heat the air and fuel in the passage as the fuel travels from the injector to the cylinder, and wherein exhaust gas passing through the exhaust gas tube flows into the air inlet branch and is drawn with the inlet air travelling through the air inlet branch into the passage so as to further heat the air and fuel mixture.

26. The fuel delivery system of claim 1 wherein the system includes temperature maintaining means for maintaining the temperature of the exhaust gas supplied to the end region of the injector to a predetermined temperature to prevent overheating of the end region.

27. The fuel delivery system of claim 26 wherein the temperature maintaining means comprises a valve for selectively allowing or shutting off flow of cooling air to mix with the exhaust gas to thereby reduce the temperature of the exhaust gas.

28. The fuel delivery system of claim 27 wherein temperature sensing means is provided within the vicinity of the end region for monitoring the temperature of the exhaust gas and opening the valve to allow flow of cooling air into the exhaust gas if the temperature raises above the predetermined temperature.

* * * * *

UNITED STATES PATENT AND TRADEMARK OFFICE
CERTIFICATE OF CORRECTION

PATENT NO.     : 6,889,671 B2                                            Page 1 of 1
DATED          : May 10, 2005
INVENTOR(S)    : Shaun Thomas Rigney It is certified that error appears in the above-identified patent and that said Letters Patent is hereby corrected as shown below:

<u>Title page,</u>
Item [30], should read:
-- [30]   Foreign Application Priority Data
June 1, 2001            (AU)..............................PR5397
December 13, 2001       (AU)..............................PR9540 --.

Signed and Sealed this

Twenty-eighth Day of March, 2006

JON W. DUDAS
*Director of the United States Patent and Trademark Office*